(12) United States Patent
Harish

(10) Patent No.: US 7,897,884 B2
(45) Date of Patent: Mar. 1, 2011

(54) METHOD AND SYSTEM OF A MULTI-ZONE CAPACITIVE FORCE-MEASURING BASED LOAD SENSING PLATFORM

(75) Inventor: Divyasimha Harish, Union City, CA (US)

(73) Assignee: Ypoint Capital, Inc., Fremont, CA (US)

(*) Notice: Subject to any disclaimer, the term of this patent is extended or adjusted under 35 U.S.C. 154(b) by 29 days.

(21) Appl. No.: 11/801,812

(22) Filed: May 10, 2007

(65) Prior Publication Data

US 2007/0261894 A1 Nov. 15, 2007

Related U.S. Application Data

(60) Provisional application No. 60/799,478, filed on May 11, 2006, provisional application No. 60/799,482, filed on May 11, 2006, provisional application No. 60/799,483, filed on May 11, 2006.

(51) Int. Cl.
| | |
|---|---|
| *G01L 1/00* | (2006.01) |
| *G01B 7/16* | (2006.01) |
| *G01G 3/18* | (2006.01) |
| *G01G 3/12* | (2006.01) |
| *G01G 19/00* | (2006.01) |

(52) U.S. Cl. ............... 177/25.13; 73/780; 73/862.626; 73/1.13; 177/210 C; 177/245; 177/144; 702/101; 340/666; 700/305

(58) Field of Classification Search .............. 177/210 C, 177/144, 238, 244, 245, 25.13, 25.15; 705/407; 361/283.1, 291; 73/1.13, 1.15, 862.52, 862.626, 73/780; 702/101; 700/305; 340/666
See application file for complete search history.

(56) References Cited

U.S. PATENT DOCUMENTS

| | | | | |
|---|---|---|---|---|
| 4,051,721 | A | | 10/1977 | Williams |
| 4,381,788 | A | * | 5/1983 | Douglas ..................... 600/535 |
| 4,384,496 | A | * | 5/1983 | Gladwin ................. 73/862.626 |
| 4,633,237 | A | * | 12/1986 | Tucknott et al. ............ 340/573.4 |
| 4,644,801 | A | * | 2/1987 | Kustanovich ........... 73/862.046 |
| 4,651,133 | A | * | 3/1987 | Ganesan et al. ................ 341/26 |
| 4,827,763 | A | * | 5/1989 | Bourland et al. ............... 73/172 |
| 4,836,033 | A | * | 6/1989 | Seitz ....................... 73/862.046 |
| 4,969,112 | A | * | 11/1990 | Castle .......................... 702/173 |
| 4,970,374 | A | * | 11/1990 | Ueda et al. .................... 219/518 |
| 5,078,220 | A | * | 1/1992 | Briefer ..................... 177/210 C |
| 5,150,759 | A | * | 9/1992 | Borchard .................. 177/210 C |
| 5,276,432 | A | * | 1/1994 | Travis ...................... 340/573.4 |
| 5,313,404 | A | * | 5/1994 | Wu ............................... 700/227 |
| 5,345,807 | A | * | 9/1994 | Butts et al. ..................... 73/1.15 |
| 5,393,935 | A | * | 2/1995 | Hasty et al. .................... 177/45 |
| 5,447,076 | A | | 9/1995 | Ziegler |
| 5,586,037 | A | * | 12/1996 | Gil et al. ........................ 705/407 |

(Continued)

*Primary Examiner* — Randy W Gibson
(74) *Attorney, Agent, or Firm* — Raj Abhyanker, P.C.

(57) ABSTRACT

Capacitive force-measuring device based load sensing platform is disclosed. In one embodiment, a load sensing platform includes a sensor surface to have one or more capacitive force-measuring devices arranged in an array, a base surface placed on top of the sensor surface to provide a contact surface of a load applied to the load sensing platform, and a control module to process data of the one or more capacitive force-measuring devices when the load is applied to the base surface. Moreover, the load sensing platform includes a communication module of the control module to communicate the weigh, position, temperature, humidity, or vibration of the load through a wired channel and/or a wireless channel. The load sensing platform may further include an alert module to generate an alert signal when a change in the position of the load exceeds a threshold value.

20 Claims, 18 Drawing Sheets

U.S. PATENT DOCUMENTS

| | | | |
|---|---|---|---|
| 5,641,947 A * | 6/1997 | Riddle, Jr. | 177/126 |
| 5,780,781 A * | 7/1998 | Berger et al. | 177/126 |
| 5,831,220 A * | 11/1998 | Ramsden et al. | 177/1 |
| 5,861,805 A * | 1/1999 | Reeves | 340/539.23 |
| 5,900,592 A * | 5/1999 | Sohns et al. | 177/210 R |
| 6,079,282 A | 6/2000 | Lanter | |
| 6,453,270 B1 * | 9/2002 | Durbin | 702/188 |
| 6,469,263 B1 * | 10/2002 | Johnson | 177/144 |
| 6,561,085 B1 * | 5/2003 | Durbin et al. | 100/50 |
| 6,649,848 B2 * | 11/2003 | Kriger | 177/25.13 |
| 6,687,656 B2 * | 2/2004 | Durbin et al. | 702/188 |
| 6,822,571 B2 * | 11/2004 | Conway | 340/573.1 |
| 6,875,932 B2 * | 4/2005 | Tuft | 177/25.13 |
| 6,927,678 B2 * | 8/2005 | Fultz et al. | 340/438 |
| 6,999,301 B1 * | 2/2006 | Sanftleben et al. | 361/312 |
| 7,047,818 B2 | 5/2006 | Dallenbach et al. | |
| 7,119,705 B2 * | 10/2006 | Manlove et al. | 340/667 |
| 7,146,294 B1 * | 12/2006 | Waitkus, Jr. | 702/188 |
| 7,176,390 B2 * | 2/2007 | Hansen et al. | 177/136 |
| 7,217,891 B2 * | 5/2007 | Fischer et al. | 177/144 |
| 7,282,654 B2 * | 10/2007 | Salgo et al. | 177/144 |
| 7,343,814 B2 * | 3/2008 | Harish et al. | 73/780 |
| 7,451,659 B2 * | 11/2008 | Dallenbach et al. | 73/780 |
| 7,575,085 B2 * | 8/2009 | Kamizono et al. | 180/273 |
| 2001/0015292 A1 * | 8/2001 | Salgo | 177/144 |
| 2002/0077875 A1 * | 6/2002 | Nadir | 705/8 |
| 2006/0054364 A1 * | 3/2006 | Kamakau | 177/180 |
| 2006/0066085 A1 * | 3/2006 | DuRocher | 280/735 |
| 2006/0158337 A1 * | 7/2006 | Cohen et al. | 340/666 |
| 2006/0196281 A1 * | 9/2006 | Koors | 73/862.626 |
| 2006/0196702 A1 * | 9/2006 | Hansen et al. | 177/210 C |
| 2007/0068720 A1 * | 3/2007 | Fischer et al. | 180/273 |
| 2007/0272450 A1 * | 11/2007 | Skinner et al. | 177/144 |
| 2008/0133372 A1 * | 6/2008 | Ramsden et al. | 705/17 |

* cited by examiner

| CARRIER ID 1102 | DATE 1104 | PORT LOC. 1106 | CONTAINER ID 1108 | FREIGHT TYPE 1110 | TARE WT. 1112 | FREIGHT WT. 1114 |
|---|---|---|---|---|---|---|
| SH 13 | 04/13/06 23:05 | SF01X | C1<br>B3<br>D4 | AG022 | 1.46T<br>1.43T<br>1.46T | 2.5T<br>2.9T<br>1.3T |
| FN 03 | 04/13/06 01:30 | SF02X | GH2 | AR01 | 2.3T | 4.7T |
| ● | ● | ● | ● | ● | ● | ● |
| ● | ● | ● | ● | ● | ● | ● |
| ● | ● | ● | ● | ● | ● | ● |

| ZONE 1402 | BOX ID 1404 | STATUS 1406 | TIME 1408 |
|---|---|---|---|
| SANTA CLARA G24 | M16, M08 | OVERDUE! | 12H:20M |
| | M32, M41, M7 | FULL | 10H:15M |
| | M5, M15 | EMPTY | 3H:55M |
| | M19 | REDUNDANT | 3 DAYS |

LOC: XYZ 949, ABC 342 1410

ZONE ROUTE MAP 1412

ROUTE TABLE VIEW 1400

| PATIENT LOC 1702 | PATIENT NAME 1704 | WEIGHT 1706 | TIME 1708 | ORIENTATION 1710 | ALERTS 1712 | SPECIAL CARE 1714 | NURSE ASSIGNED 1716 |
|---|---|---|---|---|---|---|---|
| R13A | JOHN DOE | 334 LBS | 2:11 | SUPINE ↑ | PATIENT HAS NOT SHIFTED FOR 50 MIN | DECUBITUS, ULCER, MORBID OBESITY | MARIA TOMAS |
| R14A | JACK COLE | 246 LBS | 0:21 | LEFT ← | PATIENT HAS SHIFTED 25 TIMES IN 6 MIN | DIABETES | URSULA OLDWALL |
| ● | ● | ● | ● | ● | ● | ● | ● |
| ● | ● | ● | ● | ● | ● | ● | ● |
| ● | ● | ● | ● | ● | ● | ● | ● |

WARD DATA DISPLAY TABLE 1700

FIGURE 17

METHOD AND SYSTEM OF A MULTI-ZONE CAPACITIVE FORCE-MEASURING BASED LOAD SENSING PLATFORM

This application is being filed simultaneously with an international PCT application titled, 'Capacitive Force-Measuring Device Based Load Sensing Platform'.

CLAIMS OF PRIORITY

This patent application claims priority from:
(1) U.S. Provisional patent application No. 60/799,478, titled 'Receptacle with Force-Sensing Capability Method and Apparatus" filed on May 11, 2006.
(2) U.S. Provisional patent application No. 60/799,482 titled "Resting Platform with Force-Sensing Capability Method and Apparatus", filed May 11, 2006.
(3) U.S. Provisional patent application No. 60/799,483, titled "Container with Force-Sensing Capability Method and Apparatus" filed on May 11, 2006.

FIELD OF TECHNOLOGY

This disclosure relates generally to the technical fields of measuring devices and, in one example embodiment, to a method and system of capacitive force-measuring device based load sensing platform.

BACKGROUND

Freight may be transported in containers using various carriers such as ships, trains, aircraft, trucks, etc. The carriers may have to comply with international, legal, industrial, shipping and/or commercial regulations related to the weight of the freight being carried. A record of the weight of cargo may need to be kept and/or communicated to various facilities (e.g., truck weighing stations, shipping ports, import control stations, etc.).

It may be necessary to monitor the condition (e.g., the distribution of weight) of certain freight and/or cargo to comply with safety regulation or prevent accidents from occurring due to changes in the weight or condition of the freight. Existing methods may be time-consuming or involve periods of wait while each freight container is inspected and checked for compliance with weight and/or cargo regulations (e.g., such as physically opening and/or inspecting each container in order to assess and monitor the condition and/or weight of the freight being transported).

A distributed network of mail receptacles (e.g., postal service mailboxes, courier pickup points, residential mailboxes, etc.) may be serviced by a mail operator (e.g., courier service, postal service, etc.). The mail operator may have to travel a physical route within the distributed network and access each mail receptacle in order to pick up mail contained by each mail receptacle.

The mail operator may not know whether a particular mail receptacle actually contains mail or is empty. It may be time consuming and/or inefficient for the mail operator to travel to each location in the distributed network having a mail receptacle in order to check whether each mail receptacle contains mail for pickup.

A residential or commercial owner of a mail receptacle may also have to physically visit the location of the mail receptacle to establish whether mail may have arrived. It may be time-consuming and/or difficult (e.g., due to inhospitable weather, infirmity on the part of the owner, etc.) for the owner to have to physically check the mail receptacle every time in order to establish whether mail may have arrived.

Hospitals, clinics, mental care facilities and/or other institutions having human and/or animal patients may need to monitor the weight and/or resting orientation of patients who may be confined to hospital beds, gurneys, stretchers etc. for different reasons. The patients may be overweight and develop bed sores or internal complications if they rest in one position too long.

Patients may require assistance to shift because of factors such as obesity, old age, infirmity, incapacitation, mental disorders, paralysis, etc. It may be difficult to take measurements of the weight of the patient using existing methods that require movement of the patient onto a weighing surface, lifting of the patient, and/or various other adjustments to the position of the patient. It may be difficult or risky to move the patient because the patient may be very heavy, frail, unable to be moved due to certain medical conditions, or dangerous (e.g., may pose a threat to people who approach the patient).

Existing methods that do not require lifting or moving of the patient may not be easily implemented or accurate enough to take effective readings of the weight of the patient in order to monitor aspects such as the patient's orientation, duration of the patient's resting situation, etc. Existing methods of measuring the weight of a patient may not be easily or permanently integrated into an apparatus for supporting the patient and as such may require various adjustments each time a measurement or reading of the patient's weight or orientation must be taken. Existing methods may not permit caretakers or nurses attending to the patients to assess the patient's condition without being physically present at the location of the patient.

SUMMARY

Method and system of capacitive force-measuring device based load sensing platform is disclosed. In one aspect, a load sensing platform includes a sensor surface to have one or more capacitive force-measuring devices arranged in an array, a base surface placed on top of the sensor surface to provide a contact surface of a load applied to the load sensing platform, and a control module to process data (e.g., which may be based on changes in capacitance of the one or more capacitive force-measuring devices) of the one or more capacitive force-measuring devices when the load is applied to the base surface.

Each of the changes in capacitance may be based on a displacement of a distance between two parallel conductive surfaces of a sensor capacitor in the each of the one or more capacitive force-measuring devices, a displacement of an overlap area between two parallel conductive surfaces of a sensor capacitor in the each of the one or more capacitive force-measuring devices, and/or both a displacement of a distance between two parallel conductive surfaces of a sensor capacitor in the one or more capacitive force-measuring devices and another displacement of an overlap area between another two parallel conductive surfaces of the sensor capacitor.

In addition, the data of the one or more capacitive force-measuring devices may include a weight of the load, a position of the load, a temperature of the load, a humidity of the load and/or a vibration of the load. Moreover, the load sensing platform may include a communication module of the control module to communicate the weight of the load, the position of the load, the temperature of the load, the humidity of the load, and/or the vibration of the load through a wired channel and/or a wireless channel. The load sensing platform may further include an alert module of the control module to generate an alert signal when a change in the weight, the position, the temperature, the humidity, and/or the vibration of the load exceeds a threshold value. Additionally, the load sensing platform may include a coupling grid (e.g., wireless and/or wired) to connect the one or more force-measuring devices with the control module. Also, the load sensing platform may include a reference capacitor (e.g., with an upper reference capacitor and a lower reference capacitor) in each of the one or more capacitive force-measuring devices to compensate any error in the data based on one or more environmental conditions.

In another aspect, a method includes producing deflections in one or more capacitive force-measuring devices placed below a base surface of a load sensing platform when a load is applied on the base surface, generating capacitance data from the one or more capacitive force-measuring devices due to the deflections in the one or more capacitive force-measuring devices, processing the capacitance data to determine a weight of the load, a position of the load, a temperature of the load, a humidity of the load, and/or a vibration of the load, and communicating the weight of the load, the position of the load, the temperature of the load, the humidity of the load, and/or the vibration of the load to an external device (e.g., a personal computer, a PDA, etc.).

The method may also include generating a timestamp of the capacitance data to track the weight of the load and/or the position of the load chronologically. In addition, the load sensing platform of a freight container may determine the weight, the position, the temperature, the humidity, and/or the vibration of the load in the freight container. Moreover, the load sensing platform of a mail receptacle may determine the weight, the position, the temperature, the humidity, and/or the vibration of the load in the mail receptacle. Furthermore, the method may include determining a state (e.g., an empty state, a partially-filled state, and/or a full state) of the mail receptacle based on the weight of the load.

Additionally, the method of claim may include generating an alert signal when the mail receptacle is in the full state or when the mail receptacle is unattended for more than a preset period. The method may also include rendering an optimum route to pick up mails based on the state of the mail receptacle. The load sensing platform of a patient bed may determine the weight, the position, the temperature, the humidity, and/or the vibration of the load on the patient bed. Moreover, the method may include analyzing a condition of a patient using a number of medical devices coupled to the patient bed (e.g., a temperature gauge to measure a temperature of the patient on the patient bed).

In yet another aspect, the system includes a load sensing platform to generate data based on deflections of one or more capacitive force-measuring devices arranged in an array due to a load applied on top of the load sensing platform, a control module communicatively coupled to the load sensing platform to process the data to determine a weight of the load and/or a position of the load, and a transmitter module of the control module to communicate the data (e.g., processed and/or unprocessed) to a receiver module remotely located from the load sensing platform.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 11 is a table view of freight data referenced by a receiver module, according to one embodiment.

FIG. 14 is a route table view of content referenced by a receiver module, according to one embodiment.

FIG. 17 is a table view of the ward data display of FIG. 16, according to one embodiment.

Figure 1:
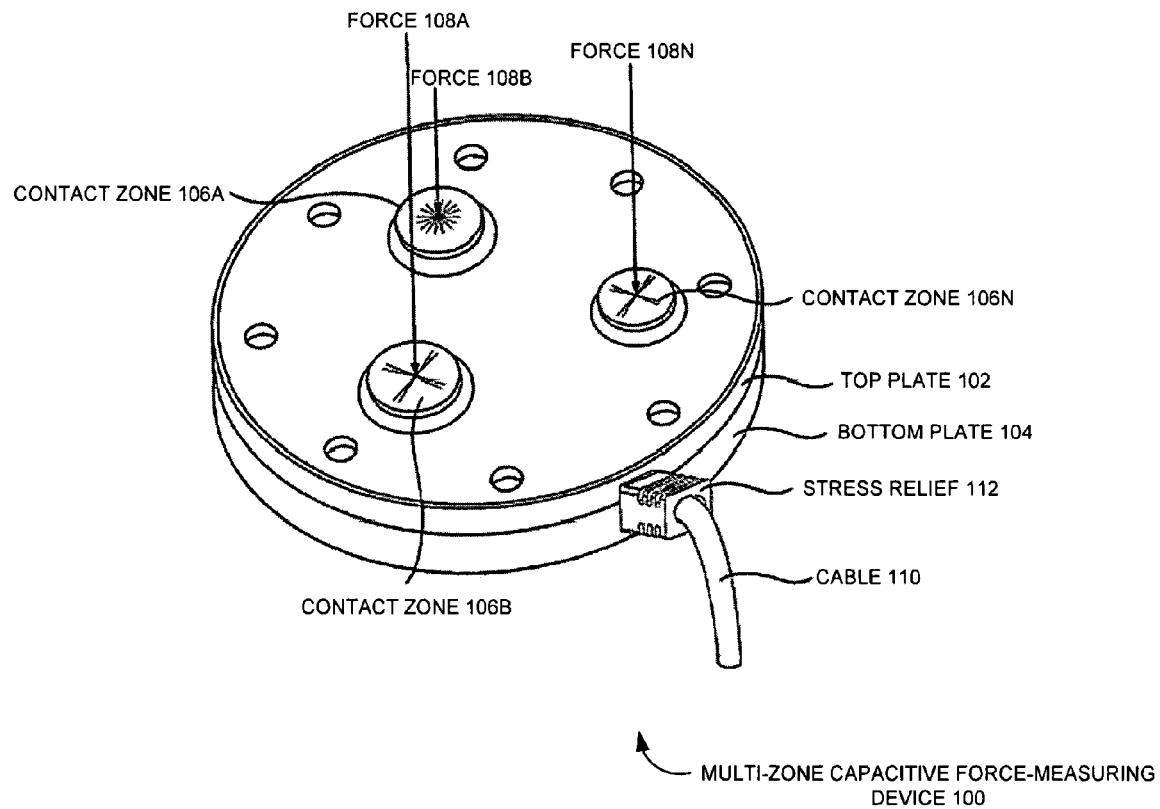
FIG. 1 is a three-dimensional view of a multi-zone capacitive force-measuring device having at least one sensor capacitor and a reference capacitor, according to one embodiment.

Other features of the present embodiments will be apparent from the accompanying drawings and from the detailed description that follows.

DETAILED DESCRIPTION

Method and system of capacitive force-measuring device based load sensing platform is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a load sensing platform (e.g., a sensor-enabled freight container 900 of FIG. 9, a sensor-enabled mailbox 1200 of FIG. 12, and/or a sensor-enabled hospital bed 1500 of FIG. 15) includes a sensor surface (e.g., a sensor surface 804, a sensor surface 1204, and/or a sensor surface 1504) to have one or more capacitive force-measuring devices (e.g., a sensor 910, sensors 1208, and/or a sensor 1512) arranged in an array, a base surface (e.g., a base surface 902, a mail surface 1202, and/or a patient surface 1502) placed on top of the sensor surface to provide a contact surface of a load (e.g., a freight 908, a mail 1216, and/or a patient 1604 of FIG. 16) applied to the load sensing platform, and a control module (e.g., a control module 908, a control module 1206, and/or a control module 1508), to process data of the one or more capacitive force-measuring devices when the load is applied to the base surface.

In another embodiment, a method includes producing deflections in one or more capacitive force-measuring devices placed below a base surface of a load sensing platform when a load is applied on the base surface, generating capacitance data from the one or more capacitive force-measuring devices due to the deflections in the one or more capacitive force-measuring devices, processing the capacitance data to determine a weight of the load, a position of the load, a temperature of the load, a humidity of the load, and/or a vibration of the load, and communicating the weight of the load, the position of the load, the temperature of the load, the humidity of the load, and the vibration of the load to an external device (e.g., a receiver module 1006 of FIG. 10, a receiver module 1300 of FIG. 13, and/or a receiver module 1608 of FIG. 16).

In yet another embodiment, the system includes a load sensing platform to generate data based on deflections of one or more capacitive force-measuring devices arranged in an array due to a load applied on top of the load sensing platform, a control module communicatively coupled to the load sensing platform to process the data to determine a weight of the load and/or a position of the load, and a communication module of the control module to communicate the data to a receiver module remotely located from the load sensing platform.

Figure 2:
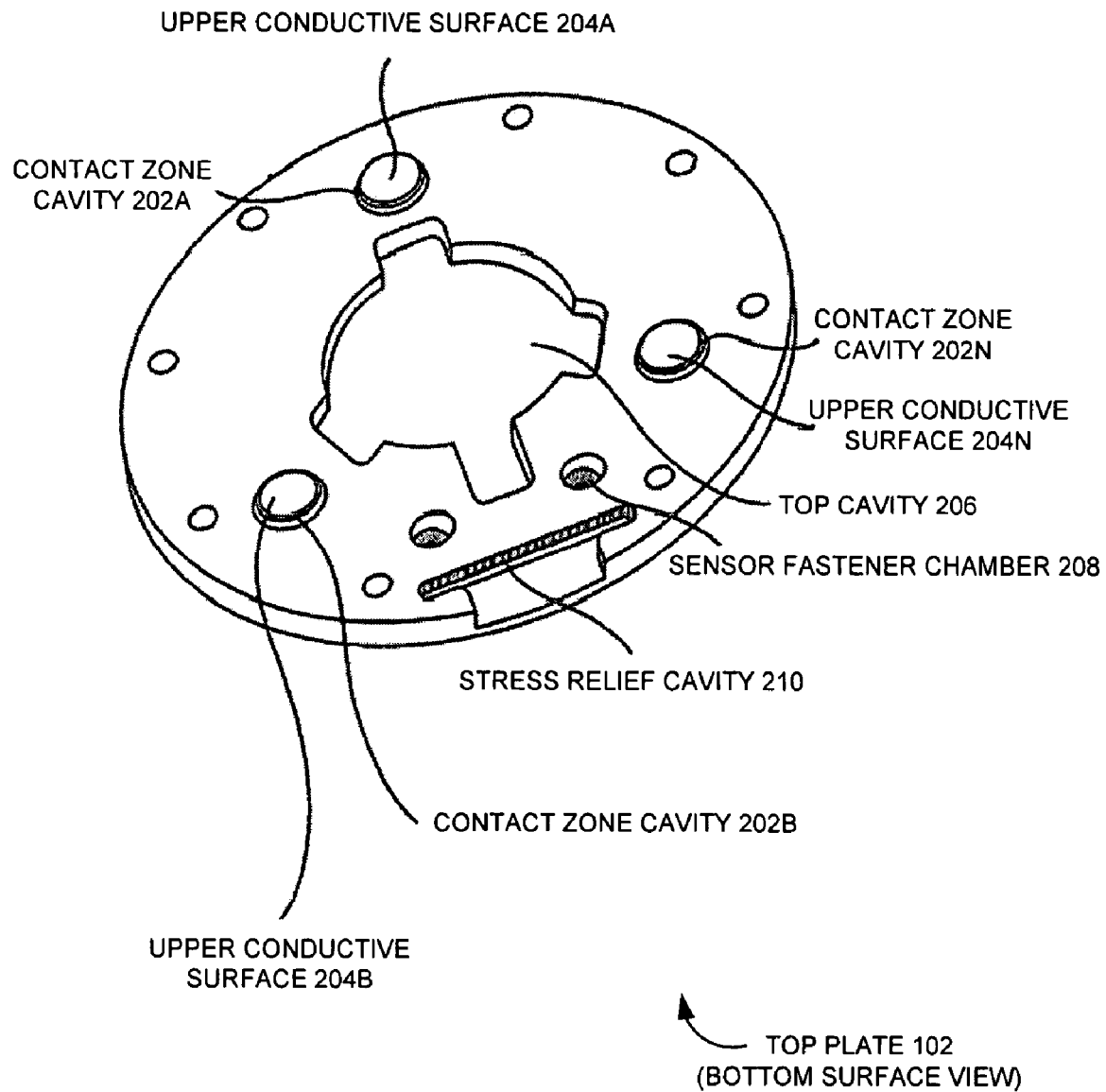
FIG. 2 is a three-dimensional view of a bottom surface of the top plate of FIG. 1, according to one embodiment.
Figure 3A:
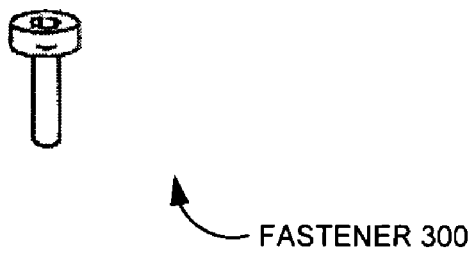
FIGS. 3A and 3B are exploded views of a fastener and a PCB which sits on a bottom cavity of FIG. 1, according to one embodiment.
Figure 3B:
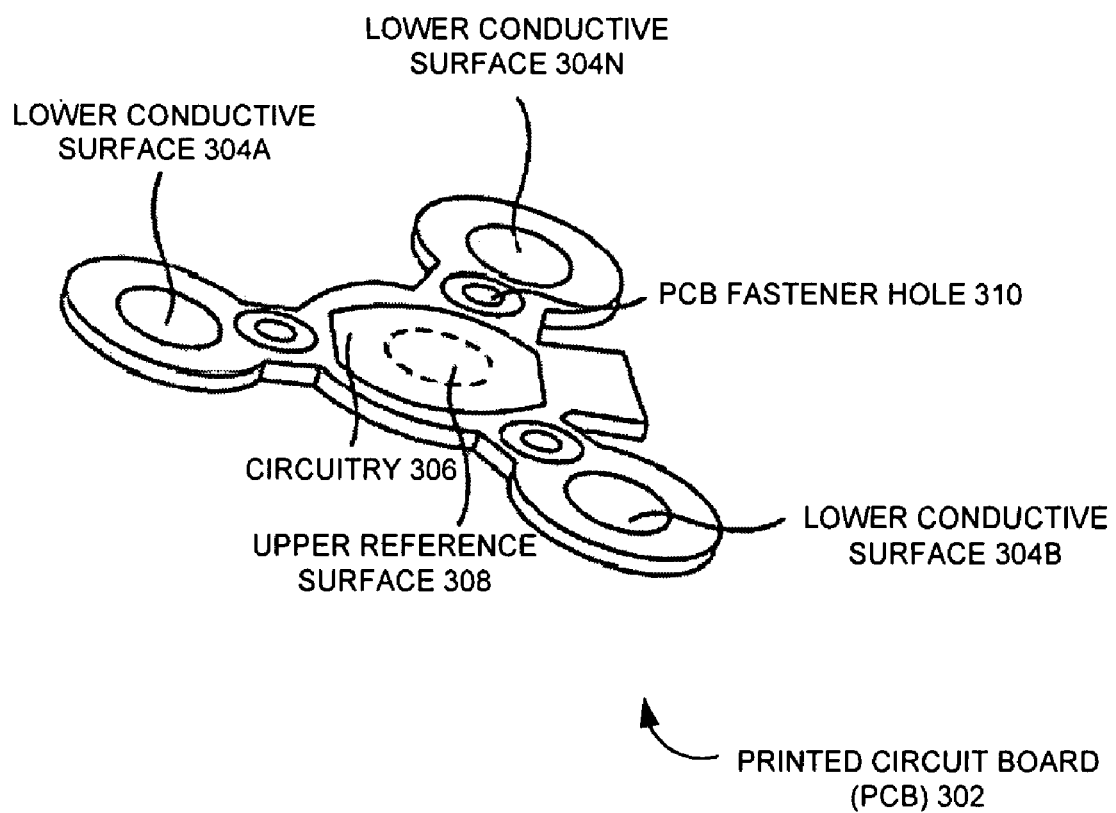
Figure 4:
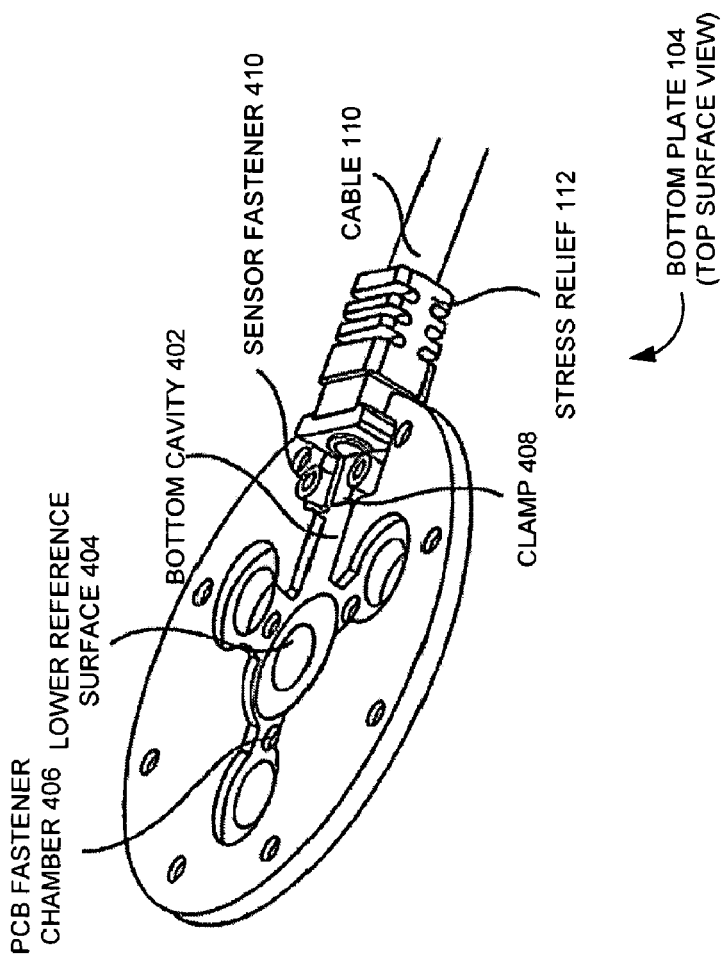
FIG. 4 is a three-dimensional view of the bottom plate having the lower reference surface, according to one embodiment.

FIG. 1 is a three-dimensional view of a multi-zone capacitive force-measuring device 100 having at least one sensor capacitor (e.g., a sensor capacitor comprising an upper conductive surface 204A of FIG. 2 and a lower conductive surface 304 of FIG. 3) and a reference capacitor (e.g., a reference capacity comprising an upper reference surface 308 of FIG. 3 and a lower reference surface 404 of FIG. 4), according to one embodiment. The multi-zone capacitive force-measuring device 100 includes a top plate 102, a bottom plate 104, a contact zone 106, a cable 110, and a stress relief 112 (e.g., made of plastic, elastomeric material, etc.). As illustrated in FIG. 1, the contact zone 106 may provide a substantial contact surface for a force (e.g., a force 108) being applied on the multi-zone capacitive force-measuring device 100. The cable 110 may be used to harvest (e.g., read, analyze, process, communicate, etc.) a measurement of the sensor capacitor where the stress relief 112 may be used to promote longevity of the cable 110 by absorbing a stress (e.g., shock, strain, etc.) applied on the cable 110.

In one example embodiment, the force 108 (e.g., a load, a weight, a pressure, etc.) may be applied on each of the contact zone 106 of the multi-zone capacitive force-measuring device 100. For instance, multiple forces 108A-N may be applied on contact zones 106A-N (e.g., which corresponds to the number of the multiple forces 108A-N). The contact zones 106A-N deflected by the multiple forces 108A-N may move down an upper conductive surface 204 of FIG. 2 of the sensor capacitor toward a lower conductive surface 304 of FIG. 3 of a printed circuit board (PCB) 302 producing a change in capacitance. In another embodiment, a housing (e.g., which may include the top plate 102, the bottom plate 104, the contact zone 106, and/or a different structure) may be made of a conductive and/or a nonconductive material. In case the nonconductive material is being used, the nonconductive material may be painted (e.g., sputtered, coated, etc.) with the conductive material. The various components of the multi-zone capacitive force-measuring device 100 may be best understood with reference to FIGS. 2-5.

FIG. 2 is a three dimensional view of a bottom surface of the top plate 102 of FIG. 1, according to one embodiment. The top plate 102 includes a contact zone cavity 202, an upper conductive surface 204, a top cavity 206, a sensor fastener chamber 208, and a stress relief cavity 210. The contact zone cavity 202 may be an indented space (e.g., of approximately $2/1000$ inch in depth) on a bottom surface of the top plate 102 which lies directly opposite to the contact zone 106 of FIG. 1 across the top plate 102. The contact zone cavity 202 may be formed using a variety of methods (e.g., drilling, milling, etching, turning, marking out, welding, hand-fabrication, grinding, etc.). Accordingly, N number of contact zone cavities (e.g., contact zone cavities 202 A-N) may be formed on the bottom surface of the top plate 102 when there is N number of contact zones (e.g., contact zones 106 A-N of FIG. 1).

The upper conductive surface 204 of the sensor capacitor may be formed on the contact zone cavity 202 (e.g., by painting a conductive material on the contact zone cavity 202 when the top plate 102 is made of a non-conductive material). A top cavity 206 (e.g., which may be located at a center of the bottom surface of the top plate 102 of FIG. 1) may have enough room to accommodate a circuitry 306 (e.g., which may include a sensor module, a comparison module, a capacitance-to-frequency converter module, a capacitance-to-voltage module, an aggregation module, an alarm module, and/or a data processing module) coupled to the PCB 302 of FIG. 3. A sensor fastener chamber 208 may provide a space for a fastener (e.g., a fastener 300 of FIG. 3) to affix the top plate 102 and the bottom plate 104 of FIG. 1. A stress relief cavity 210 may provide a space for the stress relief 112 to fit in to the bottom plate 104 of FIG. 1.

FIGS. 3A and 3B are exploded views of a fastener 300 and a PCB 302 which sits on a bottom cavity 402 of FIG. 4, according to one embodiment. FIG. 3A is an exploded view of a fastener 300. In example embodiment, the fastener 300 (e.g., threaded or unthreaded) may affix the PCB 302 to the bottom plate 104 of FIG. 1 through a PCB fastener hole 310 to a PCB fastener chamber 406 of FIG. 4.

FIG. 3B is an exploded view of the PCB 302 (e.g., which may consist of a single PCB) which includes the lower conductive surface 304, a circuitry 306, and the upper reference surface 308, and the PCB fastener hole 310. The lower conductive surface 304 may be painted (e.g., sputtered, coated, etc.) on an upper surface of the PCB 302. The figure illustrates a multiple number (e.g., three) of lower conductive surfaces 304A-N painted (e.g., sputtered, coated, etc.) on the PCB 302. Each of the lower conductive surfaces 304A-N may be combined with each of the upper conductive surfaces 204A-N of FIG. 2 to form a sensor capacitor. A gap (e.g., of approximately $2/1000$ inch) between the upper conductive surface 204 and the lower conductive surface 304 may be filled with a dielectric material (e.g., which may be solid, liquid, and/or gas where air is a convenient, easy to use dielectric).

The PCB 302 may be designed to fit the bottom cavity 402 of FIG. 4 so that the PCB may be isolated (e.g., protected) from a force applied on the multi-zone capacitive force-measuring device 100 of FIG. 1. A rear extension of the PCB 302 may be varied (e.g., shortened, extended, etc.) in size depending on a type of interface between the circuitry 306 and a communication device (e.g., a USB, a cable, a communication module, etc.). The circuitry 306 may be an electronic circuitry to perform various functions (e.g., to measure, convert, compare, add, communicate, process, and/or generate a signal data).

The upper reference surface 308 may be painted (e.g., sputtered, coated, etc.) on a bottom surface of the PCB 302. The upper reference surface 308 may be combined with the lower reference surface 404 of FIG. 4 to form a reference capacitor. A gap (e.g., approximately 2/1000 inch) between the upper reference surface 308 and the lower reference surface 404 may be filled with a dielectric material (e.g., which may be solid, liquid, and/or gas solid, liquid, and/or gas where air is a convenient, easy to use dielectric).

FIG. 4 is a three-dimensional view of the bottom plate 104 of FIG. 1 having the lower reference surface 404, according to one embodiment. The bottom plate 104 includes the bottom cavity 402, the lower reference surface 404, the PCB fastener chamber 406, a clamp 408, and a sensor fastener 410. The bottom cavity 402 (e.g., which may take a distinct shape to accommodate the PCB 302 of FIG. 3) may provide a space for the PCB 302. The lower reference surface 404 may combine with the upper reference surface 308 of FIG. 3 to form a reference capacitor (e.g., to compensate an error in the measurement due to an environmental condition such as humidity, temperature, etc.). A gap between the upper reference surface 308 and the lower reference surface 404 may be filled with a dielectric material (e.g., which may be solid, liquid, and/or gas solid, liquid, and/or gas where air is a convenient, easy to use dielectric).

The PCB fastener chamber 406 (e.g., threaded or unthreaded) may provide a space for a fastener (e.g., the fastener 300 of FIG. 3) to affix the PCB 302 and the bottom plate 104 of FIG. 1. The clamp 408 may be used to hold and/or secure the cable 110 of FIG. 1 which may be coupled to the circuitry 306 through a rear area of the PCB 302. The stress relief 112 of FIG. 1 may be used to promote longevity of the cable 110 by absorbing a stress (e.g., shock, strain, etc.) applied on the cable 110.

Figure 5A:
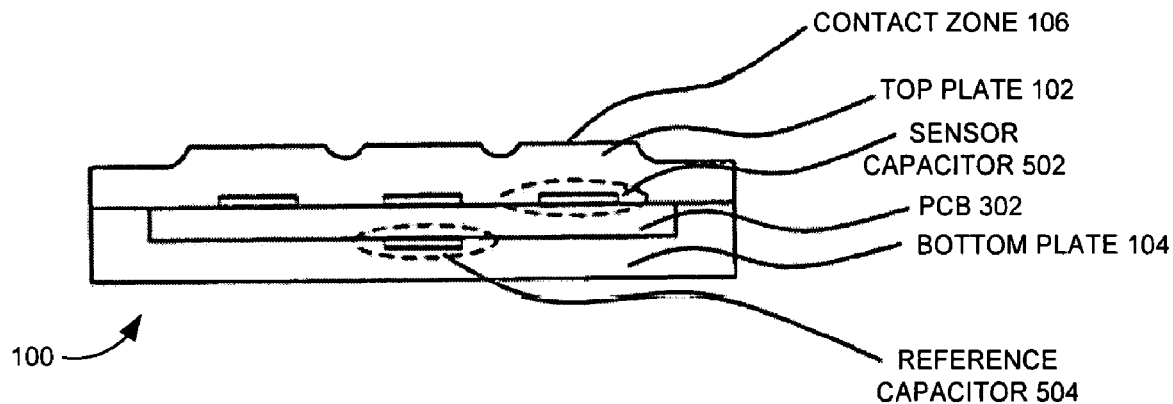
FIGS. 5A-C are cross sectional views of the multi-zone capacitive force-measuring device of FIG. 1 having multiple sensor capacitors and a reference capacitor, according to one embodiment.
Figure 5B:
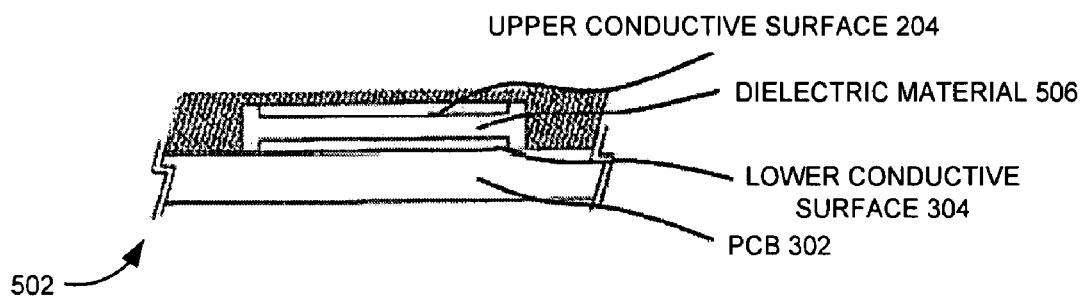
Figure 5C:
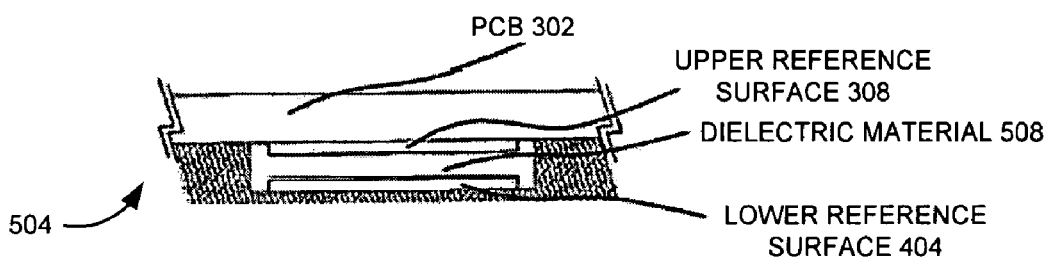

FIGS. 5A-C are cross sectional views of the multi-zone capacitive force-measuring device 100 of FIG. 1 having multiple sensor capacitors 502 and a reference capacitor 504, according to one embodiment. FIG. 5A is a cross sectional view of the multi-zone capacitive force-measuring device 100 which includes the top plate 102, the bottom plate 104, and the contact zone 106 of FIG. 1, the PCB 302 of FIG. 3, a sensor capacitor 502, and a reference capacitor 504, according to one embodiment. In one example, multiple number of sensor capacitors 502 may be based on a plurality of cavities created on a bottom surface of the top plate 102 where each of the cavities is directly below the contact zone 106 located on a top surface of the top plate 102. In another example, a reference capacitor 504 may be based on a cavity created on a top surface of the bottom plate 104 where the cavity is directly below the upper reference surface 308 of FIG. 3.

FIG. 5B is an exploded view of the sensor capacitor 502 which includes the upper conductive surface 204 of FIG. 2, the PCB 302, and the lower conductive surface 304 of FIG. 3, and a dielectric material 506. The upper conductive surface 204 may be an indented surface (e.g., of approximately 2/1000 inch in depth) of the bottom surface of the top plate 102. The upper conductive surface 204 may be painted (e.g., sputtered, coated, etc.) with a conductive material (e.g., of metal, metal alloy, etc.) when the top plate 102 of the multi-zone capacitive force-measuring device 100 of FIG. 1 is made of a non-conductive material. A cross sectional view of the indented surface may be a shape (e.g., a rectangle with its length longer than the length of the lower conductive surface 304 of FIG. 3 as illustrated in FIG. 5B) to prevent the bottom surface of the top plate 102 from coming in contact with the lower conductive surface 304 of FIG. 3 (e.g., thus preventing a short circuit between the upper conductive surface 204 and the lower conductive surface 304).

The lower conductive surface 304 may be painted (e.g., sputtered, coated, etc.) on a top surface of the PCB 302, and a dielectric material 506 (e.g., which may be solid, liquid, or gas where solid dielectrics solid, liquid, and/or gas where air is a convenient, easy to use dielectric) may be inserted between the upper conductive surface 204 of FIG. 2 and the lower conductive surface 304 of FIG. 3. In one example embodiment, the upper conductive surface 204 may be pressed down toward the lower conductive surface 304 (e.g., producing a shorter distance between the upper conductive surface 204 and the lower conductive surface 304) thus creating a change in capacitance when a force is applied on the contact zone 106 of the top plate 102 of FIG. 1.

FIG. 5C is an exploded view of the reference capacitor 504 which includes the PCB 302 and the upper reference surface 308 of FIG. 3, the lower reference surface 404 of FIG. 4, and a dielectric material 508. The lower reference surface 404 may be an indented surface (e.g., of approximately 2/1000 inch in depth) of a top surface of the bottom plate 104. The lower reference surface 404 may be painted (e.g., sputtered, coated, etc.) with a conductive material (e.g., of metal, metal alloy, etc.) when the bottom plate 104 of the multi-zone capacitive force-measuring device 100 of FIG. 1 is made of a non-conductive material. A cross sectional view of the indented surface may be a shape (e.g., a rectangle with its length longer than the length of the upper reference surface 308 of FIG. 3, etc.) to prevent the top surface of the bottom plate 104 from coming in contact with the upper reference surface 308 of FIG. 3 (e.g., thus preventing a short circuit between the upper reference surface 308 and the lower reference surface 404).

The upper reference surface 308 may be painted (e.g., sputtered, coated, etc.) on a bottom surface of the PCB 302, and a dielectric material 508 (e.g., which may be solid, liquid, or gas where solid dielectrics, solid, liquid, and/or gas where air is a convenient, easy to use dielectric) may be inserted between the upper reference surface 308 of FIG. 3 and the lower reference surface 404 of FIG. 4.

Figure 6A:
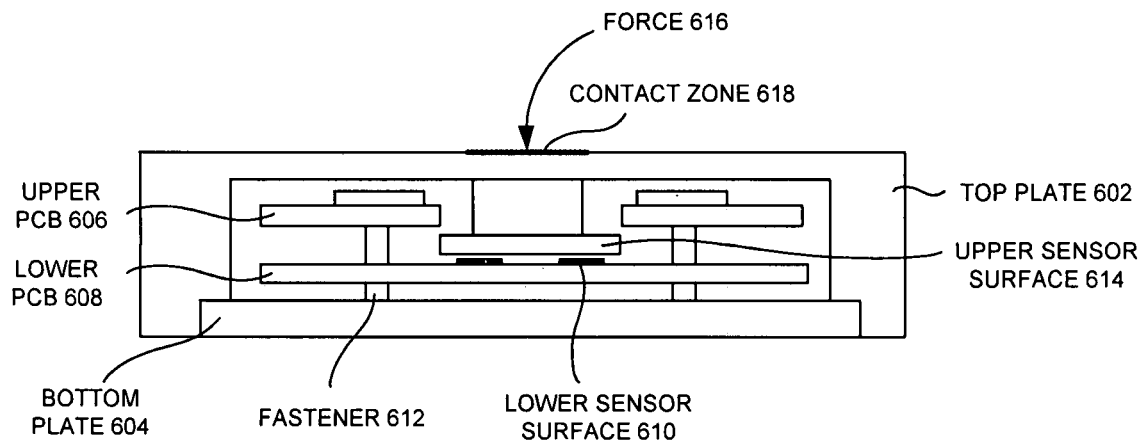
FIGS. 6A, 6B, 6C, and 6D are cross-sectional views of another capacitive force-measuring device, whereas FIGS. 6A, 6B, and 6C display three different ways of forming a sensor capacitor and FIG. 6D displays a formation of a reference capacitor, according to one embodiment.
Figure 6B:
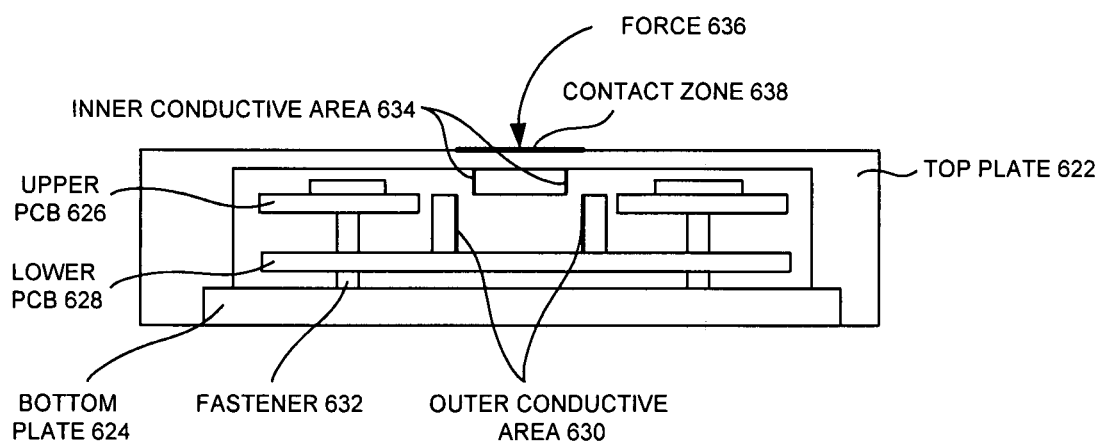
Figure 6C:
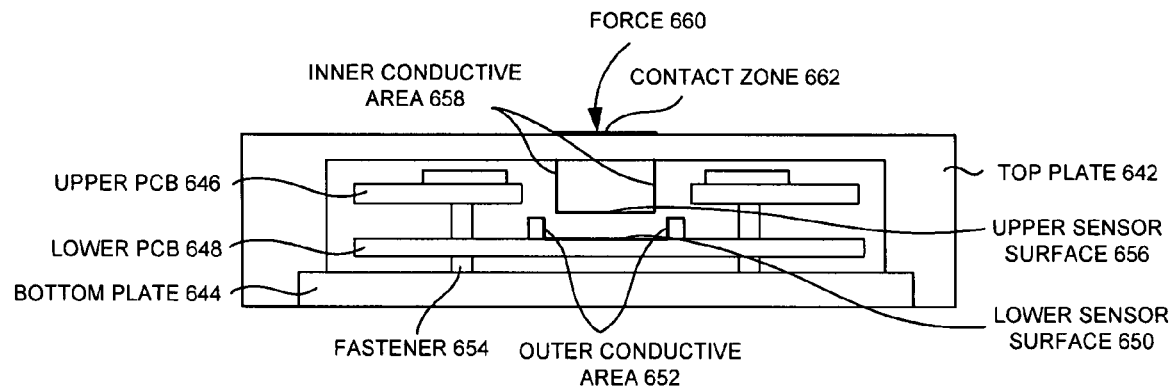
Figure 6D:
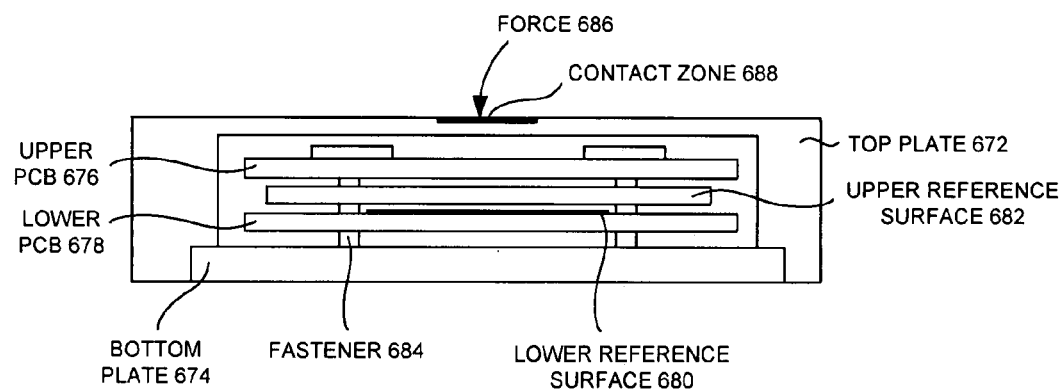

FIGS. 6A, 6B, 6C, and 6D are cross-sectional views of the capacitive force-measuring device, whereas FIGS. 6A, 6B, and 6C display three different ways of forming a sensor capacitor and FIG. 6D displays a formation of a reference capacitor, according to one embodiment.

In FIG. 6A the capacitive force-measuring device 100 (e.g., and/or the capacitive force-measuring device 150) includes a top plate 602, a bottom plate 604, an upper PCB 606, a lower PCB 608, a lower sensor surface 610, a fastener 612, an upper sensor surface 614, and a contact zone 618. A sensor capacitor may be formed between the upper sensor surface 614 and the lower sensor surface 610. The upper PCB 606, the lower PCB 608 and the bottom plate 604 may be adjoined together using the fastener 612.

A deflection of the top plate 602 (e.g., due to the force 616) may cause a change in a distance between the upper sensor surface 614 and the lower sensor surface 610 of the sensor capacitor. The change in the distance may bring about a change in capacitance of the sensor capacitor. In one example embodiment, the upper sensor surface 614 and the lower sensor surface 610 are substantially parallel to each other and have the same physical area and/or thickness. The change in capacitance of the sensor capacitor may be inversely proportional to the change in the distance.

In FIG. 6B, the capacitive force-measuring device 100 (e.g., and/or the capacitive force-measuring device 150) includes a top plate 622, a bottom plate 624, an upper PCB 626, a lower PCB 628, an outer conductive area 630, a fastener 632, an inner conductive area 634, and a contact zone 638. A sensor capacitor may be formed between the inner conductive area 634 and the outer conductive area 630. The upper PCB 626, the lower PCB 628 and the bottom plate 624 may be adjoined together using the fastener 632.

A deflection of the top plate 622 (e.g., due to the force 636) may cause a change in an overlap area of the inner conductive area 634 and the outer conductive area 630 of the sensor capacitor. The change in the overlap area may bring about a change in capacitance of the sensor capacitor. In one example embodiment, the inner conductive area 634 and the outer conductive area 630 may be substantially parallel to each other and have the same physical area and/or thickness. The change in capacitance of the sensor capacitor may be proportional to the change in the overlap area.

In FIG. 6C, the capacitive force-measuring device 100 (e.g., and/or the capacitive force-measuring device 150) includes a top plate 642, a bottom plate 644, an upper PCB 646, a lower PCB 648, a lower sensor surface 650, an outer conductive area 652, a fastener 654, an upper sensor surface 656, an inner conductive area 658, and a contact zone 662. A sensor capacitor may be formed between the upper sensor surface 656 and the lower sensor surface 650 and/or between the inner conductive area 658 and the outer conductive area 652. The upper PCB 646, the lower PCB 648 and the bottom plate 644 may be adjoined together using the fastener 654.

A deflection of the top plate 642 (e.g., due to the force 660) may cause a change in a distance between the upper sensor surface 656 and the lower sensor surface 650 and/or a change in an overlap area of the inner conductive area 658 and the outer conductive area 652 of the sensor capacitor. The change in the distance and/or the overlap area may bring about a change in capacitance of the sensor capacitor. In one example embodiment, the upper sensor surface 656 and the lower sensor surface 650 (e.g., the inner conductive area 658 and the outer conductive area 652) are substantially parallel to each other and have the same physical area and/or thickness. The change in capacitance of the sensor capacitor may be inversely proportional to the change in the distance and/or proportional to the change in the overlap area.

In FIG. 6D, the capacitive force-measuring device 100 (e.g., and/or the capacitive force-measuring device 150) includes a top plate 672, a bottom plate 674, an upper PCB 676, a lower PCB 678, a lower reference surface 680, an upper reference surface 682, a fastener 684, and a contact zone 688. A reference capacitor may be formed between the upper reference surface 682 and the lower reference surface 680. The upper PCB 676, the lower PCB 678 and the bottom plate 674 may be adjoined together using the fastener 684.

The reference sensor may experience a change in capacitance for environmental factors (e.g., a humidity, a temperature, an air pressure, a radiation, a vibration, etc.). Therefore, the environmental factors may be removed from a measurement of a change in capacitance of the sensor capacitor when the force 686 is applied to the capacitive force-measuring device 100 (e.g., thereby allowing a user to determine the change in capacitance of the sensor capacitor more accurately).

Figure 7:
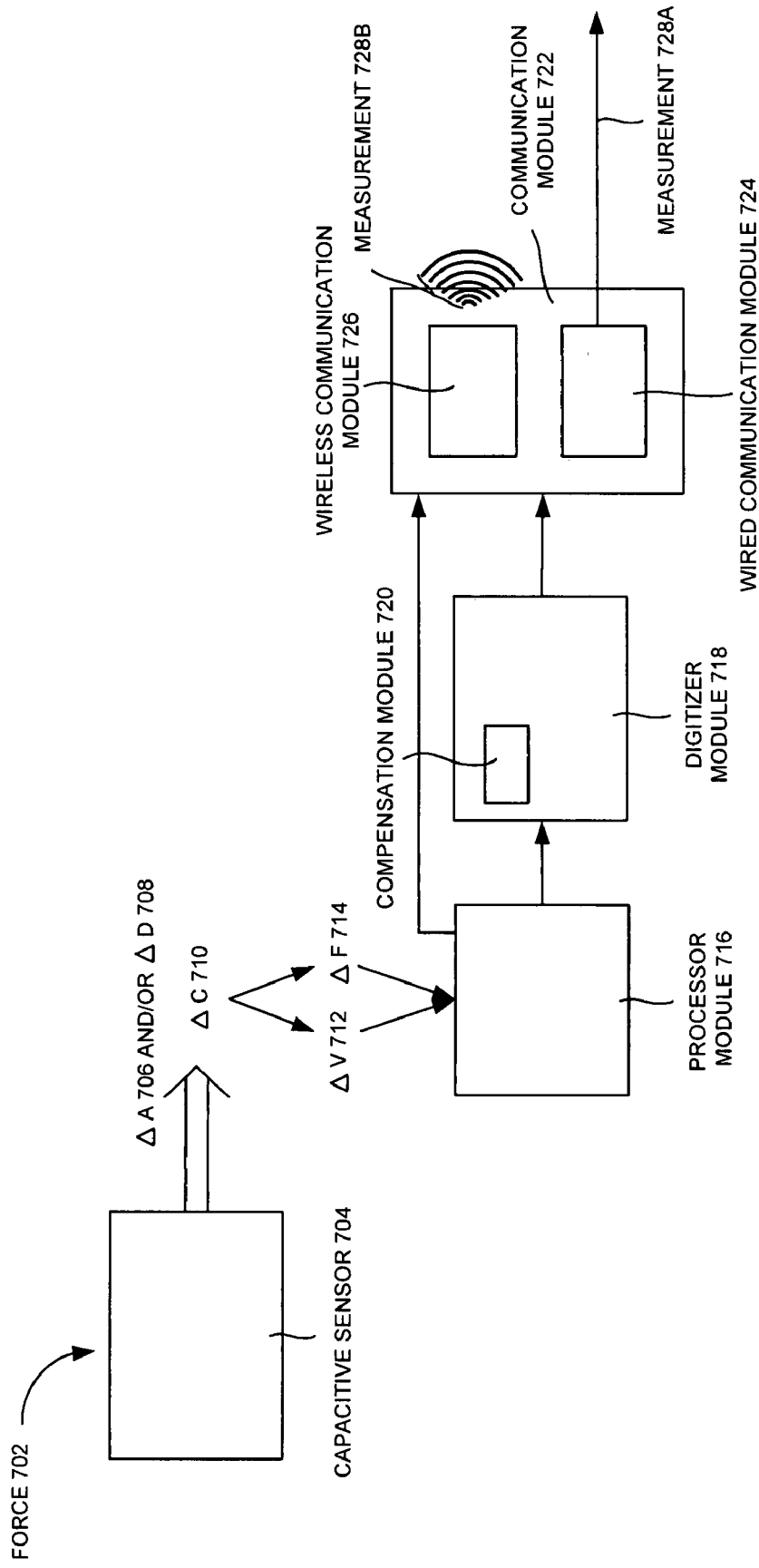
FIG. 7 is a process view of generating a measurement based on a force applied to the capacitive force-measuring device of FIGS. 1 and 6 and/or communicating the measurement, according to one embodiment.

FIG. 7 is a process view of generating a measurement 728 based on a force 702 applied to the capacitive force-measuring device 100 of FIG. 1 and/or communicating the measurement 728, according to one embodiment. In FIG. 7, a force 702 may be applied to a capacitive sensor 704 when the top plate 602 of FIG. 6 is deflected by the force 702, according to one embodiment. An electronic circuitry (e.g., a software and/or hardware code) may apply an algorithm to measure a change in distance 708 between two plates (e.g., the upper sensor surface 614 and the lower sensor surface 610) of the sensor capacitor and/or a change in overlap area 706 between another two plates (e.g., the inner conductive area 634 and the outer conductive area 630) when the force 702 is applied to the capacitive force-measuring device 100.

Next, the change in capacitance 710 may be calculated based on the change in distance 708 between the two plates and/or the change in the overlap area 706 between the another two plates forming the sensor capacitor. The change in capacitance 710, a change in voltage 712, and/or a change in a frequency 714 may also be calculated to generate a measurement (e.g., an estimation of the force 702 applied to the capacitive sensor 704). Data which encompasses the change in capacitance 710, the change in voltage 712, and/or the change in frequency 714 may be provided to a processor module 716 which directly communicate to a communication module 722 (e.g., for analog data) and/or to a digitizer module 718 (e.g., for digital data). The digitizer module 718 may work with the processor module 716 (e.g., a microprocessor which may be integrated in a signaling circuit of a PCB) to convert the change in capacitance 710, the change in voltage 712, and/or the change in frequency 714 to the measurement 728.

The digitizer module 718 may also include a compensation module 720. The compensation module 720 may apply a measurement (e.g., digital) of one or more distortion factors to another measurement (e.g., digital) to minimize an effect of the one or more distortion factors to the capacitive force-measuring device 100 of FIG. 1.

The communication module 722 includes a wired communication module 724 and a wireless communication module 726. The wired communication module 724 may communicate a universal serial bus (USB) signal, a voltage signal, a frequency signal, and/or a current signal in an analog and/or digital form to an external device. The wireless communication module 726 may wirelessly communicate with the external device based on one or more of wireless universal serial bus (USB), a Wi-Fi (e.g., of a wireless local area network), a Bluetooth (e.g., of a wireless personal area network), and/or a Zigbee (e.g., of the wireless personal are network).

In one example embodiment, the processor module 716 having a central procession unit (CPU) may execute a set of instructions associated with the digitizer module 718, the compensation module 720, and/or the communication module 722. In another example embodiment, a capacitance-to-frequency converter module may generate frequency data based on capacitance data of the capacitive sensor 704. The frequency data may be processed using a timer module (e.g., 555 timer circuit) coupled to the digitizer module 718. An effect of an input capacitance intrinsic to an operational amplifier coupled to the timer module may be minimized by driving a power supply of the operational amplifier such that a potential (e.g., voltage) of the input capacitance is substantially equivalent to a potential of a driving plate (e.g., the lower sensor surface 610 of FIG. 6A) of the capacitive sensor 704.

Figure 8:
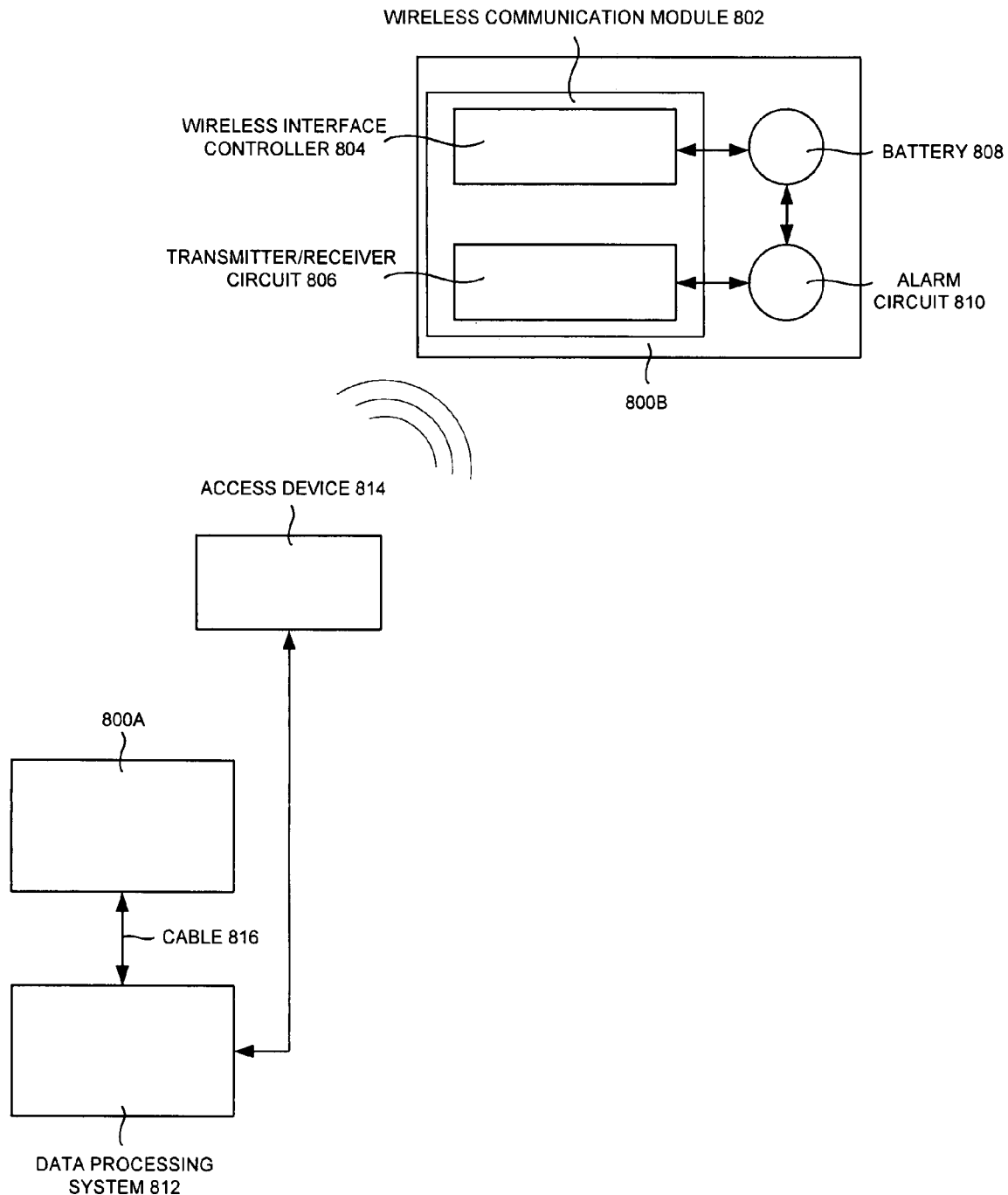
FIG. 8 is a network enabled view of a capacitive force-measuring device, according to one embodiment.

FIG. 8 is a network enabled view of the capacitive force-measuring device 100 of FIG. 1, according to one embodiment. The capacitive force-measuring device 800A is connected to a data processing system 812 (e.g., an external device) through a cable 816 as illustrated in FIG. 8. A capacitive force-measuring device 800B is wirelessly connected to the data processing system 812 through an access device 814 (e.g., a device which enables wireless communication between devices forming a wireless network). The capacitive force-measuring device 800B includes a wireless communication module 802 (e.g., the wireless communication module 726 of FIG. 7) having a transmitter/receiver circuit 806 and a wireless interface controller 804 (e.g., for wireless communication), a battery 808 (e.g., to sustain as a standalone device), and an alarm circuit 810 (e.g., to alert a user when the force to the capacitive force-measuring device 100 is greater than a threshold value and/or when the battery is almost out).

The data processing system 812 may receive data (e.g., output data measuring a force and/or a load, data measured by a sensor module) from the capacitive force-measuring device 800A and/or the capacitive force-measuring device 800B. In one embodiment, the data processing system 812 may analyze data (e.g., the measurement 728) generated by various operation of the capacitive force-measuring device 100. In another example embodiment, a universal serial bus (USB) may be included in a signaling layer of the capacitive force-measuring device 100 and/or the capacitive force-measuring device 150 of FIG. 1. The USB (e.g., a USB port or hub with mini sockets) may allow a hardware interface for the data processing system 812 (e.g., which may be an external device) and/or a hardware interface for attaching a peripheral device (e.g., a storage device such as a flash drive, etc.).

Figure 9:
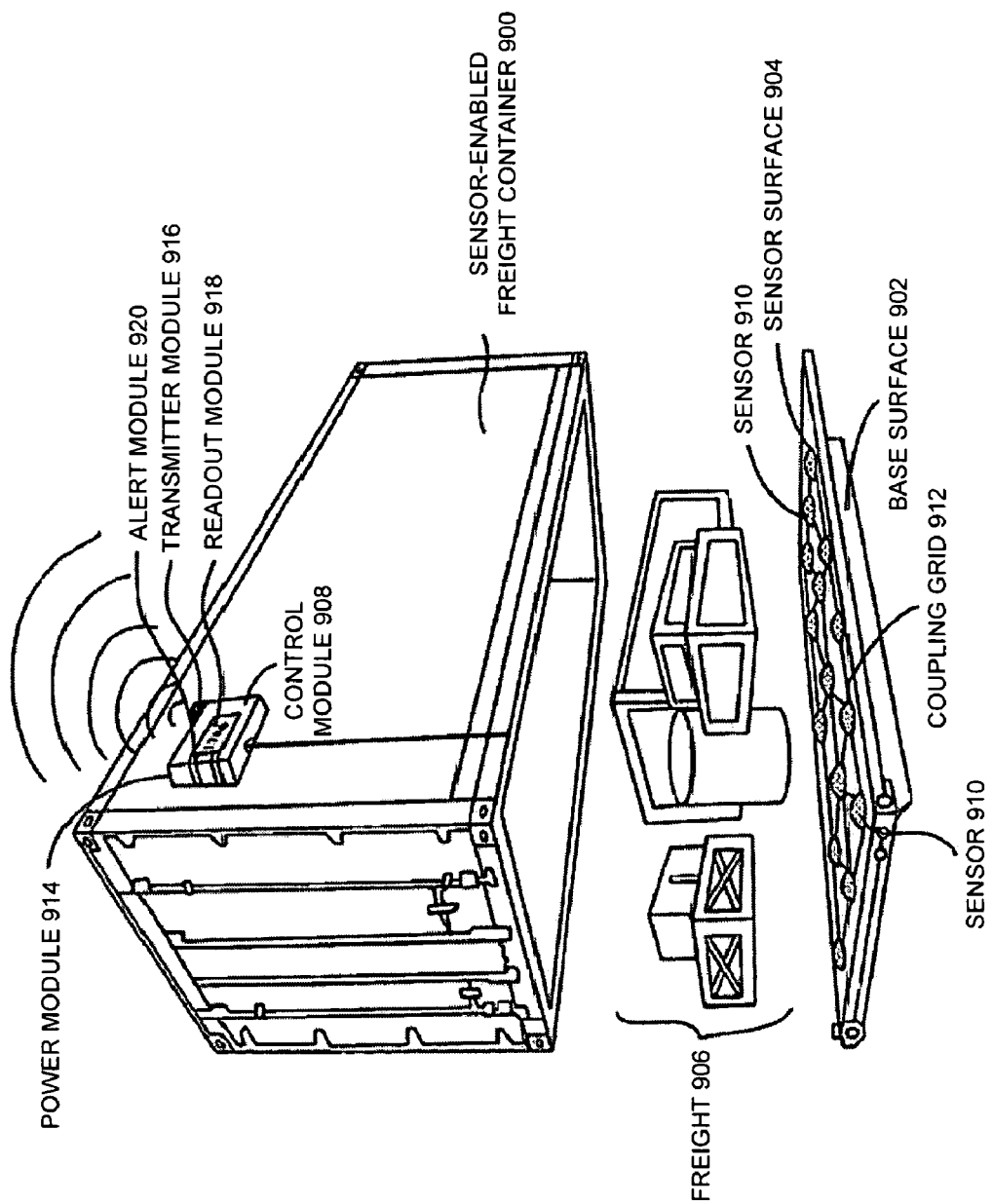
FIG. 9 is an exploded view of a container with force-sensing capability (e.g., a sensor-enabled freight container), according to one embodiment.

FIG. 9 is an exploded view of a container with force-sensing capability (e.g., a sensor-enabled freight container 900), having a base surface 902, a sensor surface 904, a freight 906, and/or a control module 908, according to one embodiment. The base surface 902 may be used to support the freight 906 (e.g., cargo, shipping, trucking and/or rail freight goods, etc.) The freight 906 may rest at any orientation relative to the base surface 902 (e.g., oblique, vertical and/or horizontal with respect to the perspective of the freight 906 item, stacked, etc.)

The sensor surface 904 may include any number and/or arrangements of sensors 910 (e.g., capacitive sensors) within and/or on the sensor surface 904. The sensors 910 may be sensitive to (e.g., may process a reading of) a force, a pressure, a weight, an orientation of a force and/or multiple forces, a relative density (e.g., a specific gravity), a distribution of the weight, a texture and/or a tactile stimulus, etc. The sensors 910 may be sensitive to changes (e.g., in a force, an orientation, etc.) over time.

A sensor 910 and/or the arrangement of sensors 910 may be connected (e.g., electrically) to each other and/or to the control module 908 through a coupling grid 912 as illustrated in the figure. The coupling grid 912 may be physical (e.g., composed of conductive material) and/or wireless (e.g., a network) linking the various sensors 910 and/or arrangements of sensors. The control module 908 may process (e.g., aggregate, record, store, track, read, calculate, analyze, communicate, monitor and/or generate, etc.) data (e.g., static and/or dynamic readings associated with each of the sensors 910 and/or arrangements of sensors 910 in and/or on the sensor surface 904). For example, the control module 908 may process the duration of a particular orientation of the freight 906 (e.g., cargo shipped in the sensor-enabled freight container 900), such as when the freight 906 has lain in a particular position for a certain amount of time. The control module 908 may, in another embodiment, process changes in a specific gravity associated with the body (e.g., due to freight 906 settlement, environmental fluctuations, atmospheric effects, movements and/or motions associated with the freight 906, etc.).

The control module 908 may include a power module, a transmitter module, a readout module 918 and/or an alert module, as illustrated in the figure. The power module 914 may be connected (e.g., electrically connected) to a power source (e.g., a voltage and/or electromotive force outlet, a battery and/or an electrical cell, an electromagnetic field, etc.). The transmitter module 916 may communicate (e.g., transmit wirelessly, through a physical connection, etc.) a data (e.g., a data processed by the control module 908) to a relay module 1002 and/or a receiver module 1006 (e.g., the relay module 1002 and the receiver module 1006 illustrated in FIG. 10).

The data may include information associated with the freight 906 (e.g., the weight, the orientation, the duration of a particular weight and/or orientation, changes in the weight and/or orientation etc. of the freight 906 having contact with the sensor surface 904). The readout module 918 may process (e.g., interpret, display, generate, record, and/or convert, etc.) data (e.g., data communicated by the control module 908 using the transmitter module 916 and/or via a physical connection) associated with the freight 906.

The readout module 918 may display and/or indicate (e.g., using an LED display, an LCD display, a fluorescent display, an audio-visual display, an audio signal, etc.) a data associated with the weight (e.g., the gravitational force exerted by) the freight 906 (e.g., for any and/or multiple orientations and/or angles of contact of the freight 906 and/or combinations of freight 906 relative to the sensor surface 904). The readout module 918 may indicate the freight 906 weight according to any one and/or number of conventions (e.g., units of measurement), such as tons, pounds, kilograms, grams, ounces, Newtons, etc.

The readout module 918 may display and/or indicate (e.g., visually and/or audibly) an orientation (e.g., a representation) of the situation of the freight 906 (e.g., stacked, side-by-side, moments of force exerted by the freight 906 at any angle relative to the plane of the sensor surface 904, imbalanced load, etc.) relative to any number of static and/or dynamic (e.g., temporal) markers. For example, the orientation display may indicate the situation of the freight 906 at any one moment in time and/or a representation of an average situation maintained for a period of time. The readout module 918 may also indicate (e.g., visually and/or audibly) a temporal duration (e.g., a period of time) associated with the weight and/or situation of the freight 906 (e.g., certain freight 906 and/or cargo may sublimate, radioactively decay and/or lose mass over time, etc.).

For example, the readout module 918 may reset itself to indicate the start of a duration associated with a new event at every change in the weight and/or the orientation of the freight 906 (e.g., based on a preset and/or automatically calculated sensitivity), may change periodically independent of changes in other metrics associated with a status of the freight 906, may change based on any combination of changes associated with the weight and/or orientation of the freight 906, may change based on manual and/or external inputs, and/or may change based on fluctuations of a certain magnitude (e.g., absolute and/or relative to an established and/or automatically derived marker) in the freight 906's weight and/or orientation.

The alert module 920 may communicate with the control module 908 to process an indication (e.g., a visual and/or audible signal, alert, warning, notifier, etc.) based on an occurrence of an event (e.g., an event detected by the sensors 910 in and/or on the sensor surface 904) such as a large magnitude of movement by the freight 906 (e.g., indicating a potentially damaging fall or shifting of the freight 906), a fluctuation and/or stagnancy in the weight, orientation and/or time associated with the freight 906 and/or an external event (e.g., a blow to the sensor-enabled freight container 900), etc. For example, the alert module 920 may trigger an alarm in response to a movement by a certain section of the freight 906 within a threshold distance from another section of the freight 906 (e.g., the different sections may hold freight 906 that should not come into contact with each other). In another example, the alarm may be triggered based on increasingly stagnant (e.g., fluctuations of a declining magnitude) readings of the force exerted by the freight 906 in any plane (e.g., liquid freight 906 may congeal and become more viscous, powdery freight 906 may harden, etc.).

Figure 10:
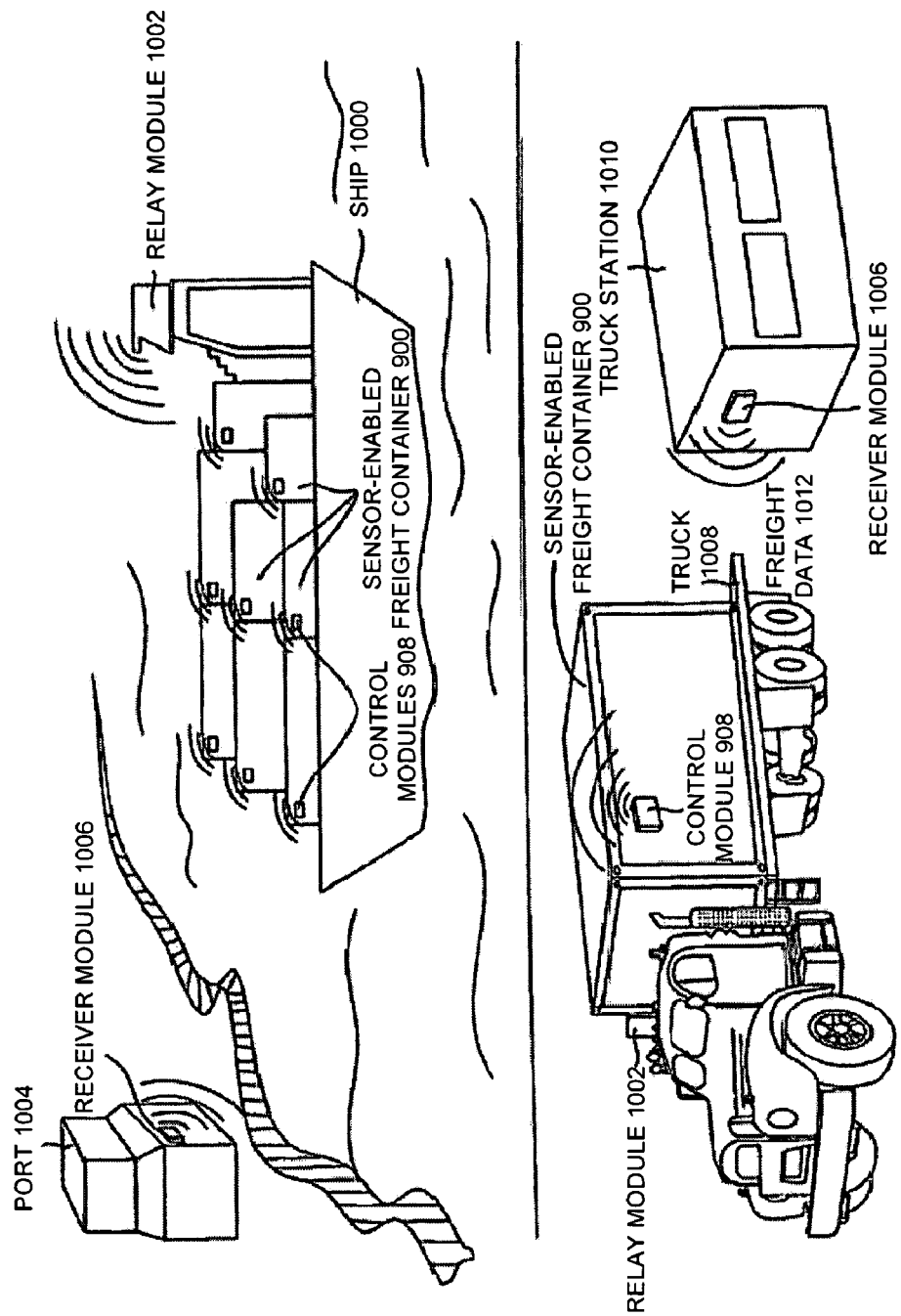
FIG. 10 is a system view of the sensor-enabled freight container, having a shipping port setting and a truck station setting.

FIG. 10 is a system view of the sensor-enabled freight container 900, having a shipping port setting and a truck station setting. The shipping port setting includes a ship 1000 having a relay module 1002 and sensor-enabled freight containers 900 having control modules 908, and a port 1004 having a receiver module. The truck station setting includes a truck 1008 (e.g., a freight delivery truck) having a relay module, a sensor-enabled freight container 900 having a control module 908, and a truck station 1010 having a receiver module.

The sensor-enabled freight containers 900 may include control modules 908 (e.g., the control module 908 illustrated in FIG. 9). The control modules 908 associated with each sensor-enabled freight container 900 may transmit (e.g., using the transmitter module 916 illustrated in FIG. 9) a freight data 1012 (e.g., a weight data, an orientation data and/or a time data) through a wireless and/or physical network. The freight data 1012 may include the data displayed by the readout module 918 as illustrated in FIG. 9.

The freight data 1012 may be transmitted to a relay modules 1002 (e.g., the relay modules 1002 associated with the ship 1000 and/or the truck 1008 as illustrated in FIG. 10) and/or a receiver module 1006 (e.g., the shipping port receiver module 1006 and/or the truck station 1010 receiver module 1006 illustrated in FIG. 10). For example, the control modules 908 associated with each sensor-enabled freight container 900 may transmit freight data 1012 (e.g., using the transmitter module 916 illustrated in FIG. 9) to the relay modules 1002 (e.g., the ship relay modules 1002 or the truck relay modules 1002 illustrated in FIG. 10).

The ship relay modules 1002 and/or the truck relay modules 1002 may process the freight data 1012 (e.g., record a freight manifesto based on the freight data) and/or communicate (e.g., transmit) the freight data 1012 to a receiver module 1006 (e.g., the shipping port receiver module 1006 and/or the truck station 1010 receiver module 1006 illustrated in FIG. 10). The receiver module 1006 may process the freight data 1012 (e.g., may check compliance with port and/or freight shipping weight regulations, record a transmitted manifesto, etc.).

FIG. 11 is a table view of freight data 1100 referenced by the receiver module 1006 (e.g., associated with the shipping port and/or the truck station 1010 illustrated in FIG. 10), having a carrier ID field 1102, a date field 1104, a port location field 1106, a container ID field 1108, a freight type field 1110, a tare weight field 1112, a freight weight field 1114, and/or a compliance threshold field. The carrier ID field 1102 may display an identifier associated with a carrier (e.g., a ship, a boat, an airplane, a jet, a carrier, etc.) and/or a carrier (e.g., a truck, a van, a tram, a train, a railroad carriage, a car, etc.)

The date field 1104 may display a date and/or a time associated with the freight data 1012 display. The port location field 1106 may display an identifier code associated with a particular port and/or station location (e.g., according to an external, conventional and/or ubiquitous reference). The container ID field 1108 may display a unique identifier associated with a particular container (e.g., the sensor-enabled freight container 900 illustrated in FIG. 1) carried by the carrier. The freight type field 1110 may display a categorization identifying the nature of the freight carried by the container (e.g., radioactive, agricultural, arms, perishable, toxic, etc.).

The tare weight field 1112 may display a reading of the tare weight of the container identified in the container ID field 1108. The tare weight of the container may be the weight of the container and/or packing material without the freight or goods being shipped, or the gross weight of the freight shipment (e.g., including the weight of the container) less the net weight of the goods being shipped. The freight weight field 1114 may display a reading of the weight of the freight (e.g., after adjusting for the tare weight of the sensor-enabled freight container 900).

For example, two hypothetical freight data 1012 table views are illustrated in FIG. 11. The carrier ID field 1102 displays 'SH13' and 'FN03,' indicating identifiers associated with the carriers transmitting the freight data. The date field 1104 displays 'Mar. 13, 2006, 23:05' and 'Mar. 13, 2006, 01:30,' indicating that the freight data 212 readings for the carriers 'SH13' and 'FN03' took place on 'Mar. 13, 2006' at '23:05' and '01:30' respectively.

The port location field 1106 displays 'SFO1X' and 'SFO2X,' indicating that freight data 1012 associated with carrier 'SH13' was processed at the port/station 'SFO1X,' and that freight data 1012 associated with carrier 'FN03' was processed at the port/station 'SFO2X.' The container ID field 1108 displays 'C1, B3, D4' and 'GH2,' indicating that carrier 'SH13' was carrying containers C1, B3, and D4, while carrier 'TR03' was carrying container GH2.

The freight type field 1110 displays 'AG022' and 'AR01,' indicating that containers C1, B3, and D4 carried by carrier 'SH13' had freight of the type 'AG022,' and that container GH2 carried by carrier 'FN03' had freight of the type 'AR021.' The tare weight field 1112 displays '1.46 T, 1.43 T, 1.46 T' and '2.3 T,' indicating that the tare weight of the containers C1, B3, and D4 are 1.46 tons, 1.43 tons, and 1.46 tons respectively, and that the tare weight of the container GH2 is 2.3 tons. The freight weight field 1114 displays '2.5 T, 2.9 T, 1.3 T' and '4.7 T,' indicating that the weight of the freight carried by containers C1, B3, and D4 are 2.5 tons, 2.9 tons and 1.3 tons respectively, and that the weight of the freight carried by the container GH2 is 4.7 tons.

Figure 12:
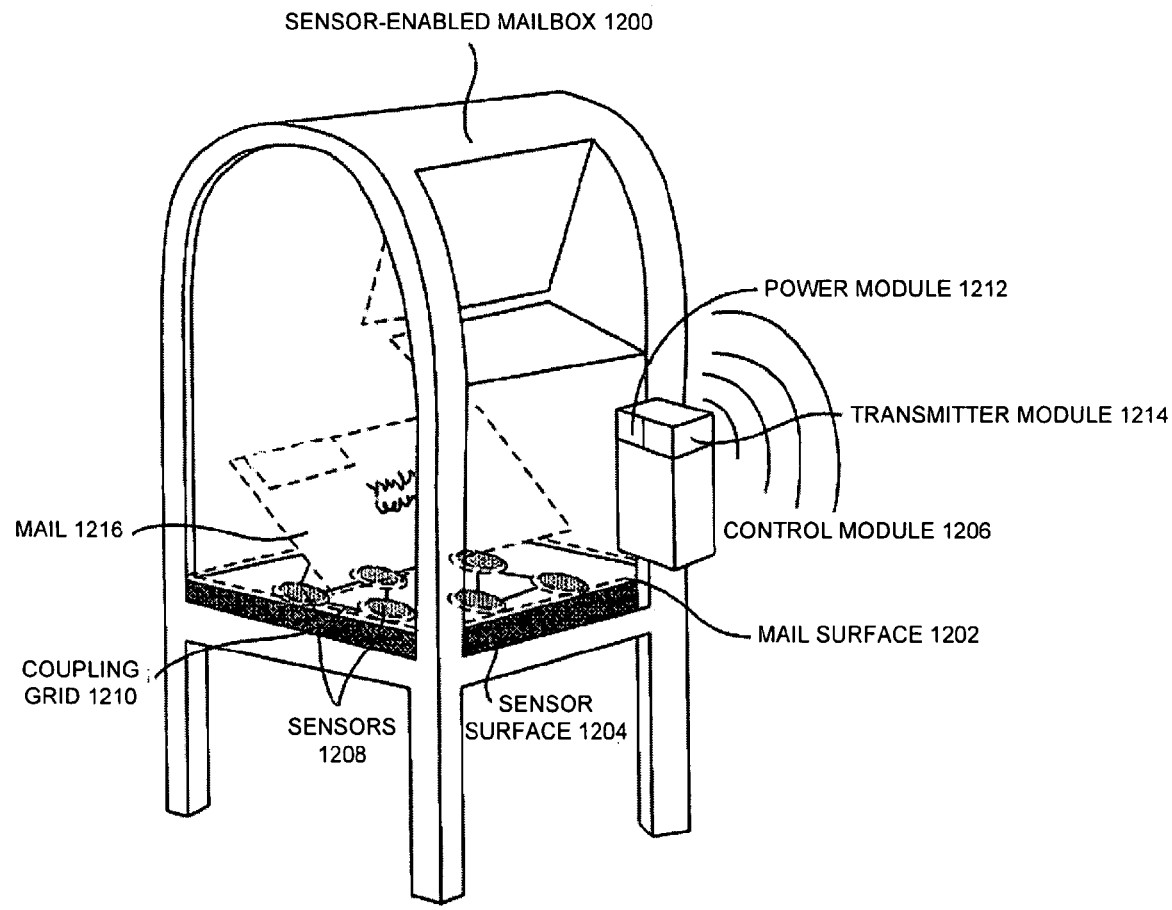
FIG. 12 is an exploded view of a receptacle (e.g., a sensor-enabled mailbox), according to one embodiment.

FIG. 12 is an exploded view of a receptacle (e.g., a sensor-enabled mailbox 1200), having a mail surface 1202, a sensor surface 1204, and/or a control module 1206, according to one embodiment. The mailbox may be any receptacle for items (e.g., that is emptied and/or checked periodically) that accumulate over time (e.g., postal mailbox, courier pickup box, delivery trays, etc.). The mail surface 1202 may be used to support a mail 1216 (e.g., packages, letters, envelopes, documents, etc.) that is placed at any orientation in the mailbox.

The sensor surface 1204 may include any number and/or arrangements of sensors (e.g., capacitive sensors) within and/ or on the sensor surface 1204. The sensors may be sensitive to (e.g., may process a reading of) a force, a pressure, a weight, an orientation of a force and/or multiple forces, a relative density (e.g., a specific gravity), a texture and/or a tactile stimulus, etc. The sensors may be sensitive to changes (e.g., in a force, an orientation, etc.) over time.

A sensor and/or the arrangement of sensors may be connected (e.g., electrically) to each other and/or to the control module 1206 through a coupling grid 1210 as illustrated in the figure. The coupling grid 1210 may be physical (e.g., composed of conductive material) and/or wireless (e.g., a network) linking the various sensors and/or arrangements of sensors. The control module 1206 may process (e.g., aggregate, record, store, track, read, calculate, analyze, communicate, monitor and/or generate, etc.) data (e.g., static and/or dynamic readings associated with each of the sensors and/or arrangements of sensors in and/or on the sensor surface 1204).

For example, the control module 1206 may process the mail 1216 status (e.g., an extent to which the mailbox is empty or full of mail, based on an absolute mail 1216 capacity of the sensor-enabled mailbox 1200, a mail 1216 weight to mailbox capacity ratio, a critical weight reading processed of the sensors, etc.) of the mailbox.

The control module 1206 may include a power module 1212 and/or a transmitter module 1214, as illustrated in the figure. The power module 1212 may be connected (e.g., electrically connected) to a power source (e.g., a voltage and/or electromotive force outlet, a battery and/or electrical cell, an electromagnetic field, etc.). The transmitter module 1214 may communicate (e.g., transmit wirelessly, through a physical connection, etc.) a data (e.g., a data associated with the mail status processed by the control module 1206) to a receiver (e.g., a receiver module 1300 associated with a mail receiver 1302, as illustrated in FIG. 13).

The data may include information associated with the mail 1216 (e.g., the weight, the orientation, the capacity, the mailbox fullness status, the duration of a particular weight and/or orientation, changes in the weight and/or orientation etc. of the mail 1216 having contact with the mail surface 1202). The receiver module 1006 may process (e.g., interpret, display, generate, record, and/or convert, etc.) data (e.g., data communicated by the control module 1206 using the transmitter module 1214 and/or via a physical connection) associated with the mail 1216 in the sensor-enabled mailbox 1200.

Figure 13:
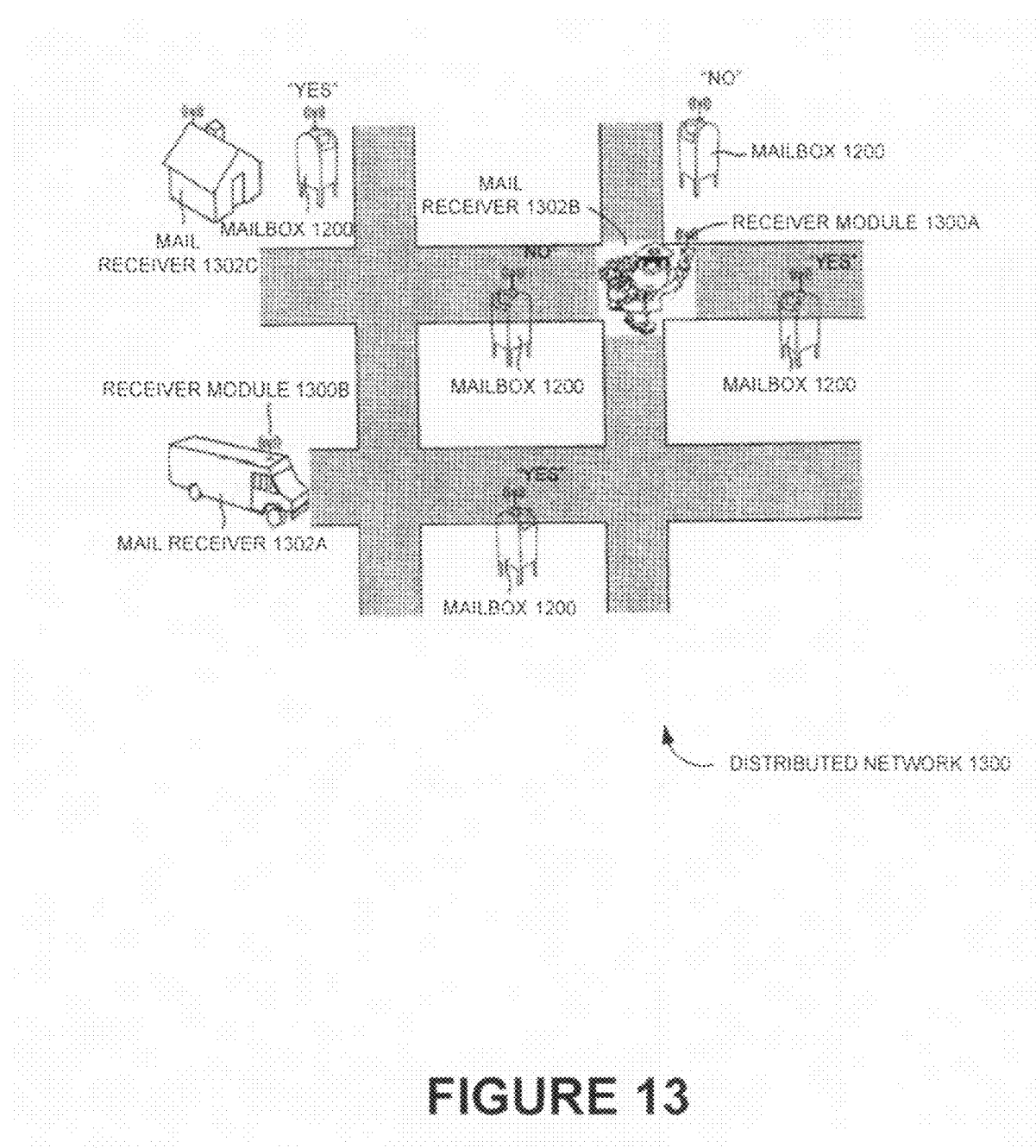
FIG. 13 is a distributed network view of any number of receptacles (e.g., sensor-enabled mailboxes) having relevance to a mail receiver, according to one embodiment.

FIG. 13 is a distributed network 1300 (e.g., a zone, a territory, a division, a geographical area, etc.) of any number of mailboxes having relevance to a mail receiver 1302 (e.g., a mail operator, a postman 1302B, a household 1302C, an organization, a post office, a courier service 1302A, etc.), having any number of sensor-enabled mailboxes 1200, mail receivers 1302, and/or receiver modules 1300 associated with the mail receivers 1302, according to one embodiment. The mailboxes may be sensor-enabled mailboxes 1200 such as that illustrated in FIG. 12. The mail receivers 1302 may periodically and/or sporadically check (e.g., inspect to verify status and/or collect mail if present) a mailbox and/or any number of mailboxes of the arrangement of mailboxes (e.g., based on a time period, an schedule, and/or an indication of mail status (e.g., presence, absence, volume, quantity, etc.) communicated by the control module 1206 associated with the sensor-enabled mailboxes 1200).

FIG. 14 is a route table view 1400 of content referenced by the receiver module 1300 (e.g., the receiver module 1300 associated with a receiver such as a courier service 1302A, as illustrated in FIG. 13), having a zone field 1402, a mailbox ID field 1404, a status field 1406, a time field 1408, a location field 1410, and/or a route map view 1412. The zone field 1402 may display an identifier associated with a geographical area (e.g., a locality, a route, a territory, a zone, etc.). The mailbox ID field 1404 may display an identifier associated with a particular sensor-enabled mailbox 1200 of the arrangement of mailboxes illustrated in FIG. 13.

The status field 1406 may display a notification associated with the mailbox status (e.g., the full and/or partial extent to which the mailbox referenced in the mailbox ID field 1404 may be full or empty, and/or a mailbox status notification indicating whether the contents of the mailbox are ready for pickup and/or delivery). The time field 1408 may indicate a chronological marker associated with the duration of the mailbox status referenced in the status field 1406 (e.g., the duration may be measured from the last time the mailbox status was changed).

The location field 1410 may display an identifier referencing a position (e.g., a dynamic and/or static positioning reference indicator such as a GPS coordinate associated with the movement of a particular receiver such as a courier service) within the geographical area indicated in the zone field 1402. The route map view 1412 may display (e.g., through a graphical user interface, a visual display and/or an audible indicator) a calculated route (e.g., a locus of intended movement mapped for a receiver 1414 such as a courier service), based on data associated with the mailbox status (e.g., the mailbox status indicated in the status field 1406) of various mailboxes in the geographical area referenced in the zone field 1402. Based on a change in the status of a particular mailbox, the route may be recalculated such that the receiver 1414 may adjust an intended path.

For example, a hypothetical route table view is illustrated in FIG. 14. The zone field 1402 displays 'SANTA CLARA G24,' indicating a geographical area of relevance to a particular receiver 1414 such as a courier service vehicle having a receiver module 1300 and/or servicing the indicated zone.

The mailbox ID field 1404 displays 'M16,' 'M08,' 'M32,' 'M41,' 'M7,' 'M5,' 'M15,' and 'M19,' indicating various identifiers associated with the arrangement of mailboxes in the zone such as is illustrated in FIG. 13. The status field 1406 indicates 'Overdue!,' 'Active,' 'Empty,' and 'Redundant,' indicating a status associated with each of the mailboxes identified in the mailbox ID field 1404.

For example, the mailbox ID and status field 1406s indicate that the mailbox having mailbox ID 'M16' is 'Overdue!' (e.g., the mailbox may have been full for a long period of time, possibly preventing additional mail from being deposited). The mailboxes having mailbox IDs 'M08,' 'M32,' 'M41,' and 'M7' are 'Active,' indicating that they are ready to be serviced (e.g., the mailboxes contain mail for pickup) by the receiver 1414 such as a courier service.

The mailboxes having mailbox IDs 'M5' and 'M15' are 'Empty,' indicating that it may be unnecessary for the receiver 1414 to service those particular mailboxes. The mailbox having mailbox ID 'M19' is 'Redundant,' indicating that the mailbox may have been empty for a long period of time and may not need to be in service at all (e.g., it may not make sense to have a mailbox in that particular location).

The time field 1408 displays '12 h 20 m,' '10 h 15 m,' '3 h 55 m,' and '3 days,' indicating various durations of time associated with the status indicated in the status field 1406 corresponding to each of the mailboxes identified in the mailbox ID field 1404. For example, the time field 1408 entries indicate that mailbox 'M16' has been 'Overdue!' for 12 hours and 20 minutes, that mailboxes 'M08,' 'M32,' 'M41,' and 'M7' have been 'Active' for 10 hours and 15 minutes (e.g., in total or each), that mailboxes 'M5' and 'M15' have been 'Empty' for 3 hours and 55 minutes, and that mailbox 'M19' has been 'Redundant' for '3 Days.'

The time field 1408 may also indicate a duration of time associated with the status of each mailbox in particular. The location field 1410 displays 'XYZ949, ABC 342,' indicating a positioning reference (e.g., a GPS coordinate) for the receiver module 1006 associated with a receiver 1414 such as a courier service servicing the route indicated in the route map display of FIG. 14. The route map display shows the various mailboxes referenced in the mailbox ID field 1404, each having a signal (e.g., a visual and/or audible indicator corresponding to their status as indicated in the status field 1406) within a particular geographical framework (e.g., a vehicle route for a courier service associated with the zone indicated in the zone field 1402).

The route map display also indicates a route (e.g., a path) for the receiver 1414, based on a prioritization of service points (e.g., mailboxes requiring urgent pickup service because they are full, mailboxes requiring pickup service because they contain mail, and/or mailboxes that do not require service because they do not contain mail). Based on the mailbox status associated with each of the mailboxes identified in the mailbox ID field 1404, the route map display indicates a best path for the receiver 1414 such as a courier service to service the mailboxes in the area indicated in the zone field 1402.

For example, the route map display indicates the best path for the illustrated receiver 1414 (e.g., a courier service pickup van), such that the mailbox 'M16' that is 'Overdue!' is serviced first, the mailboxes 'M08,' 'M32,' 'M41,' and 'M7' are serviced next because they are active and contain mail for pickup, and the mailboxes 'M5' and 'M15' are ignored since they are 'Empty.' (e.g., the receiver 1414 may save time and or realize various economies by receiving information related to the status of each mailbox that is processed and communicated to the receiver 1414 before the receiver 1414 services the mailboxes).

Figure 15:
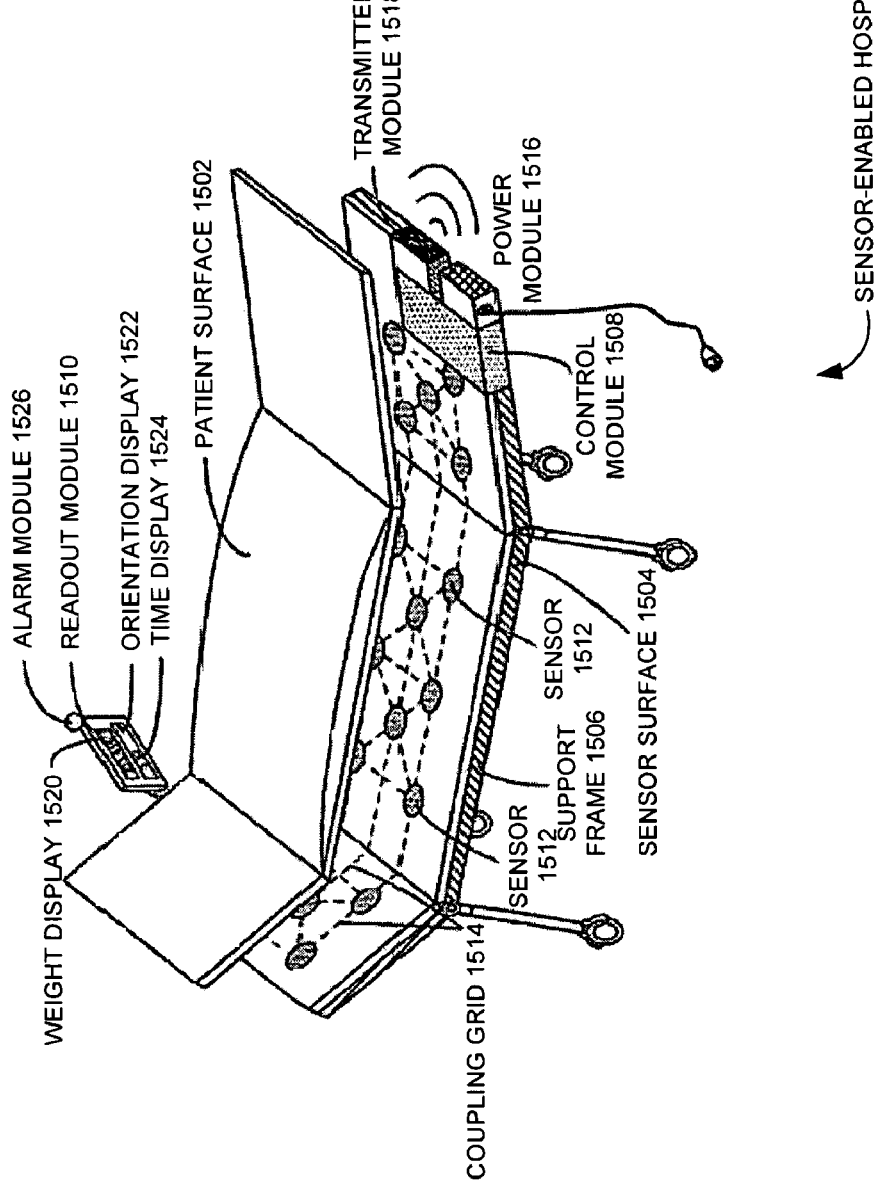
FIG. 15 is an exploded view of a resting platform with force-sensing capability (e.g., a sensor-enabled hospital bed), according to one embodiment.

FIG. 15 is an exploded view of a resting platform with force-sensing capability (e.g., a sensor-enabled hospital bed 1500), having a patient surface 1502, a sensor surface 1504, a support frame 1506, a control module 1508 and/or a readout module 1510, according to one embodiment. The patient surface 1502 may be used to support a body (e.g., a human and/or animal hospital patient, a corpse, etc.). The body may rest at any orientation relative to the patient surface (e.g., prone, seated, upright, sideways, etc.).

The sensor surface 1504 may include any number and/or arrangements of sensors 1512 (e.g., capacitive sensors) within and/or on the sensor surface 1504. The sensors 1512 may be sensitive to (e.g., may process a reading of) a force, a pressure, a weight, an orientation of a force and/or multiple forces, a relative density (e.g., a specific gravity), a texture and/or a tactile stimulus, etc. The sensors 1512 may be sensitive to changes (e.g., in a force, an orientation, etc.) over time.

A sensor 1512 and/or the arrangement of sensors 1512 may be connected (e.g., electrically) to each other and/or to the control module 1508 through a coupling grid 1514 as illustrated in the figure. The coupling grid 1514 may be physical (e.g., composed of conductive material) and/or wireless (e.g., a network) linking the various sensors 1512 and/or arrangements of sensors. The support frame 1506 may include any number of mechanical features (e.g., support features such as booms, levers, hinge, legs, struts, sheets etc.).

The control module 1508 may process (e.g., aggregate, record, store, track, read, calculate, analyze, communicate, monitor and/or generate, etc.) data (e.g., static and/or dynamic readings associated with each of the sensors 1512 and/or arrangements of sensors 1512 in and/or on the sensor surface 1504). For example, the control module 1508 may process the duration of a particular orientation of the body (e.g., a human hospital patient), such as when the body has lain in a particular position for a certain amount of time. The control module 1508 may, in another embodiment, process changes in a specific gravity associated with the body (e.g., due to physiological changes, environmental fluctuations, atmospheric effects, movements and/or motions associated with the body, etc.).

The control module 1508 may include a power module 1516 and/or a transmitter module 1518, as illustrated in the figure. The power module 1516 may be connected (e.g., electrically connected) to a power source (e.g., a voltage and/or electromotive force outlet, a battery and/or an electrical cell, an electromagnetic field, etc.). The transmitter module 1518 may communicate (e.g., transmit wirelessly, through a physical connection, etc.) a data (e.g., a data processed by the control module 1508) to a receiver (e.g., a receiver module 1608 in a nurse station 1606, as illustrated in FIG. 16).

The data may include information associated with the body (e.g., the weight, the orientation, the duration of a particular weight and/or orientation, changes in the weight and/or orientation etc. of the body having contact with the patient surface). The readout module 1510 may process (e.g., interpret, display, generate, record, and/or convert, etc.) data (e.g., data communicated by the control module 1508 using the transmitter module 1518 and/or via a physical connection) associated with the patient.

The readout module 1510 may include a weight display 1520, an orientation display 1522, a time display 1524 and/or an alarm module 1526. The weight display 1520 may display and/or indicate (e.g., using an LED display, an LCD display, a fluorescent display, an audio-visual display, an audio signal, etc.) a data associated with the weight (e.g., the gravitational force exerted by) the patient (e.g., for any and/or multiple orientations and/or angles of contact of the patient relative to the patient surface). The weight display 1520 may indicate the weight of the patient according to any one and/or number of conventions (e.g., units of measurement), such as pounds, kilograms, grams, ounces, Newtons, etc.

The orientation display 1522 may display and/or indicate (e.g., visually and/or audibly) an orientation (e.g., a representation) of the situation of the patient (e.g., the position in which the patient is lying) relative to any number of static and/or dynamic (e.g., temporal) markers. For example, the orientation display 1522 may indicate the position of the patient at any one moment in time and/or a representation of an average position maintained for a period of time. The time display 1524 may indicate (e.g., visually and/or audibly) a temporal duration (e.g., a period of time) associated with the weight and/or orientation of the patient.

For example, the time display 1524 may change (e.g., reset itself to indicate the start of a duration associated with a new event) at every change in the weight and/or the orientation of the patient (e.g., based on a preset and/or automatically calculated sensitivity), may change periodically independent of changes in the other displays, may change based on any combination of changes associated with the weight and/or orientation of the patient, may change based on manual and/or external inputs, and/or may change based on fluctuations of a certain magnitude (e.g., absolute and/or relative to an established and/or automatically derived marker) in the patient's weight and/or orientation.

The alarm module 1526 may communicate with the control module 1508 to process an alarm (e.g., a visual and/or audible signal, alert, warning, notifier, etc.) based on an occurrence of an event (e.g., an event detected by the sensors 1512 in and/or on the sensor surface 1504) such as a movement by the patient, a fluctuation and/or stagnancy in the weight, orientation and/or time associated with the weight and/or orientation of the patient and/or an external event, etc. For example, the alarm module 1526 may trigger an alarm in response to a movement by the patient within a threshold distance from an edge of the sensor-enabled hospital bed 1500. In another example, the alarm may be triggered based on a protracted period of stillness and/or restlessness of the patient.

Figure 16:
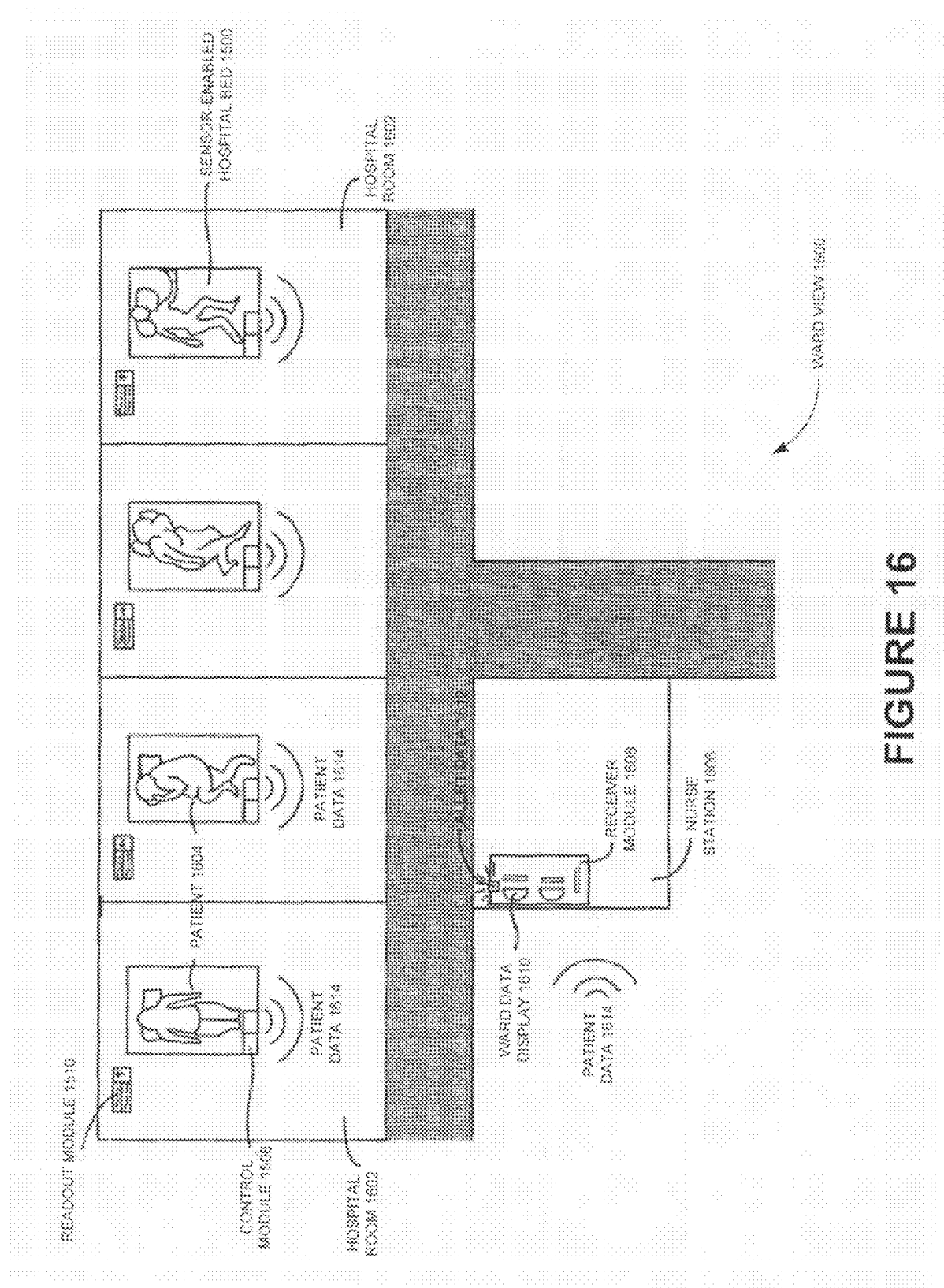
FIG. 16 is a ward view of an arrangement of sensor-enabled hospital beds in a hospital environment, according to one embodiment.

FIG. 16 is a ward view 1600 of an arrangement of sensor-enabled hospital beds in a hospital environment, according to one embodiment. FIG. 16 shows the ward as having hospital rooms 1602, sensor-enabled hospital beds 1500, patients, and/or a nurse station 1606. The hospital rooms 1602 (e.g., wards, morgues, divisions, etc.) may be locations associated with the patients (e.g., human and/or animal, alive and/or dead). The nurse station 1606 may be a location associated with nurses (e.g., caretakers, attendants, supervisors, monitors, etc.) of the patients.

The sensor-enabled hospital beds 1500 may include control modules 1508 (e.g., the control module 1508 illustrated in FIG. 15). The control modules 1508 associated with each sensor-enabled hospital bed 1500 may transmit (e.g., using the transmitter module 1518 illustrated in FIG. 15) a patient data 1614 (e.g., a weight data, an orientation data and/or a time data) through a wireless and/or physical network. The patient data 1614 may include the data displayed by the readout module 1510 as illustrated in FIG. 15.

The patient data 1614 may be transmitted to a receiver module 1006 (e.g., illustrated as being located in the nurse station 1606 in FIG. 16). The receiver module 1608 may include a ward data display 1610 and/or an alert module. The ward data display 1610 (e.g., a screen, a projection, a readout, a user interface, a printed display, etc.) may indicate (e.g., display visually and/or audibly) information (e.g., a ward data and/or meta data) associated with multiple patient data 1614 transmitted by the control modules 1508 associated with the sensor-enabled hospital beds 1500 in each hospital room 1602, as illustrated in FIG. 16.

The ward data may contain information and/or meta-data associated with the patients of the ward (e.g., weight, orientation and/or time data transmitted by the control modules 1508 associated with the sensor-enabled hospital bed 1500 of each patient). The alert module 1612 may generate a visual and/or audible alert signal (e.g., unilaterally and/or in a communication with the alarm modules 1526 associated with each sensor-enabled hospital bed 1500 as illustrated in FIG. 15) based on a pattern in the patient data 1614 processed by the receiver module 1608 (e.g., a pattern of data associated with a condition of a patient and/or a number of patients and/or having significance to a nurse) and/or an occurrence of an event (e.g., an event detected by the sensors 1512 in and/or on the sensor surface 1504) such as a movement by the patient, a fluctuation and/or stagnancy in the weight, orientation and/or time associated with the weight and/or orientation of the patient and/or an external event, etc.

For example, the alert module 1612 may trigger an alert in response to a movement by the patient within a threshold distance from an edge of the sensor-enabled hospital bed 1500. In another example, the alert may be triggered based on a protracted period of stillness and/or restlessness of the patient.

In yet another example, the alert may be triggered based on a temporal, event-based and/or periodic marker (e.g., an administrative routine, a schedule, etc.) contingent on and/or independent of the condition and/or patient data 1614 associated with a patient and/or any number of patients. For example, the alert module 1612 may remind the nurse to attend to the patients at a certain time, and/or based on a change in their weight, orientation and/or duration associated with their orientation.

FIG. 17 is a table view 1700 of the ward data display 1610 of FIG. 16, having a patient location field 1702, a patient name field 1704, a weight field 1706, a time field 1708, an orientation field 1710, an alerts field 1712, a special care field 1714, and/or a nurse assigned field 1716, according to one embodiment. The patient location field 1702 may display an identifier associated with the position of a patient in the ward (e.g., a hospital room 1602, a section, a division, a room number, etc.).

The patient name field 1704 may display an identifier referencing a name associated with the identity of the patient. The weight field 1706 may display data (e.g., associated with the weight display 1520 of the readout module 1510 illustrated in FIG. 15) communicated by the control module 1508 associated with the sensor-enabled hospital bed 1500 of the patient. The time field 1708 may display data (e.g., associated with the time display 1524 of the readout module 1510 illustrated in FIG. 15) communicated by the control module 1508 associated with the sensor-enabled hospital bed 1500 of the patient.

The orientation field 1710 may display data (e.g., associated with the orientation display 1522 of the readout module 1510 illustrated in FIG. 15) communicated by the control module 1508 associated with the sensor-enabled hospital bed 1500 of the patient. The alerts field 1712 may display data (e.g., associated with the alert module 1612 of the receiver module 1608 in the nurse station 1606 illustrated in FIG. 16). The special care field 1714 may display data associated with a condition of and/or information about the patient (e.g., a medical condition, an affliction, a biographical data, a handicap, a disability, etc.)

The nurse assigned field 1716 may display an identifier referencing the name and/or identity of the nurse assigned to the patient (e.g., in a caretaking, supervisory, monitory, etc. capacity). For example, two hypothetical patients are illustrated in the ward data display table view 1700 of FIG. 17.

In one example, the patient name field 1704 displays 'John Doe,' indicating the name of the patient is John Doe. The patient location field 1702 displays 'R13A,' indicating that John Doe is located in Room 13A. The weight field 1706 displays '334 lbs', indicating that John Doe's current weight is 334 pounds. The orientation field 1710 displays 'supine-↑,' indicating that John Doe is lying on his back on the sensor-enabled hospital bed 1500 in Room 13A. The time field 1708 displays '52:11,' indicating that John Doe has been lying on his back for 52 minutes and 11 seconds.

The alerts field 1712 displays 'Patient has not shifted for 40 min,' indicating that John Doe has been lying motionless on his back for 40 minutes. The special care field 1714 displays 'decubitus ulcers, morbid obesity,' indicating that John Doe suffers from decubitus ulcers (e.g., bed sores) and morbid obesity (e.g., it may be dangerous for John Doe to remain in the same position for protracted periods of time, and/or John Doe may not be able to shift his position without assistance). The nurse assigned field 1716 displays 'Maria Tomas,' indicating that the nurse who is attending to John Doe (e.g., the caretaker who is responsible for responding to alerts and/or general care for John Doe) is Maria Tomas.

In another example, the patient name field 1704 displays 'Jack Cole,' indicating the name of the patient is Jack Cole. The patient location field 1702 displays 'R14A,' indicating that Jack Cole is located in Room 14A. The weight field 1706 displays '246 lbs', indicating that Jack Cole's current weight is 246 pounds. The orientation field 1710 displays 'left-←,' indicating that Jack Cole is lying on his left side on the sensor-enabled hospital bed 1500 in Room 14A.

The time field 1708 displays '0:21,' indicating that Jack Cole has been lying on his left side for 21 seconds. The alerts field 1712 displays 'Patient has shifted 25 times in 6 min,' indicating that Jack Cole has shifted his position 25 times in 6 minutes (e.g., is excessively restless). The special care field 1714 displays 'diabetes,' indicating that Jack Cole suffers from diabetes (e.g., Jack Cole's restlessness may be an indication that he requires medication and/or attention). The nurse assigned field 1716 displays 'Ursula Oldwall,' indicating that the nurse who is attending to Jack Cole (e.g., the nurse who is responsible for responding to alerts and/or general care for Jack Cole) is Ursula Oldwall.

Although the present embodiments have been described with reference to specific example embodiments, it will be evident that various modifications and changes may be made to these embodiments without departing from the broader spirit and scope of the various embodiments.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A load sensing platform, comprising:
    a sensor surface to have a plurality of capacitive force-measuring devices arranged in an array;
    a base surface placed on top of the sensor surface to provide a contact surface of a load applied to the load sensing platform;
    a reference sensor surface to have a plurality of reference capacitive devices to compensate error in data of the plurality of capacitive force-measuring devices when the load is applied to the base surface; and
    a control module to process the data of the plurality of capacitive force-measuring devices and error-compensation data of the plurality of reference capacitive devices when the load is applied to the base surface, wherein the data of the plurality of capacitive force-measuring devices are based on changes in capacitance of the plurality of capacitive force-measuring devices due to the load, and wherein processing of the data comprises at least one of aggregating, recording, storing, tracking, reading, calculating, analyzing, communicating, monitoring values generated by the sensor surface and the reference sensor surface, calculating the duration of the load, a particular orientation of the load for a particular duration of time on the base surface of the load sensing platform, calculating changes in a specific gravity associated with the load and generating a timestamp on of the data to track the weight of the load and/or the position of the load.

2. The load sensing platform of claim 1, wherein each one of the changes in capacitance is based on a displacement of a distance between two parallel conductive surfaces of a sensor capacitor in the each of the plurality of capacitive force-measuring devices.

3. The load sensing platform of claim 1, wherein each one of the changes in capacitance is based on a displacement of an overlap area between two parallel conductive surfaces of a sensor capacitor in the each of the plurality of capacitive force measuring devices.

4. The load sensing platform of claim 1, wherein each one of the changes in capacitance is based on both a displacement of a distance between two parallel conductive surfaces of a sensor capacitor in the each of the plurality of capacitive force measuring devices and another displacement of an overlap area between another two parallel conductive surfaces of the sensor capacitor.

5. The load sensing platform of claim 1, wherein the data of the plurality of capacitive force-measuring devices include at least one of a weight of the load, a position of the load, a temperature of the load, a humidity of the load, and a vibration of the load.

6. The load sensing platform of claim 5, further comprising a communication module of the control module to communicate the at least one of the weight of the load and the position of the load through at least one of a wired channel and a wireless channel.

7. The load sensing platform of claim 6, further comprising an alert module of the control module to generate an alert signal when a change in at least one of the weight of the load, the position of the load, the temperature of the load, the humidity of the load and the vibration of the load exceeds a threshold value.

8. The load sensing platform of claim 7, further comprising a coupling grid to connect the plurality of force-measuring devices with the control module, wherein the coupling grid is based on at least one of a wireless technology and a wired technology.

9. The load sensing platform of claim 8, wherein the error compensation data is based on at least one environmental condition, and wherein each of the plurality of the reference capacitive devices have an upper reference surface and a lower reference surface.

10. A method, comprising:
    producing deflections in a plurality of capacitive force-measuring devices placed below a base surface of a load sensing platform when a load is applied on the base surface;
    generating capacitance data from the plurality of capacitive force-measuring devices due to the deflections in the plurality of capacitive force-measuring devices;
    generating error data from a plurality of reference capacitive devices based on at least one environmental condition when the load is applied to the base surface;
    processing the capacitance data and the error data in a control module external to both the plurality of capacitive force-measuring devices and the plurality of reference capacitive devices to determine at least one of a weight of the load, a position of the load, a temperature of the load, a humidity of the load, and a vibration of the load, wherein processing of the data further comprises at least one of aggregating, recording, storing, tracking, reading, calculating, analyzing, communicating, monitoring values generated by the sensor surface and the reference sensor surface, calculating the duration of the load, a particular orientation of the load for a particular duration of time on the base surface of the load sensing platform, calculating changes in a specific gravity associated with the load and generating a timestamp on of the data to track the weight of the load and/or the position of the load; and communicating the at least one of the weight of the load, the position of the load, the temperature of the load, the humidity of the load, and the vibration of the load to an external device.

11. The method of claim 10, further comprising generating a timestamp of the capacitance data and the error data to track the at least one of the weight of the load, the position of the load, the temperature of the load, the humidity of the load, and the vibration of the load chronologically.

12. The method of claim 10, wherein the load sensing platform of a freight container is used to determine the at least one of the weight of the load, the position of the load, the temperature of the load, the humidity of the load and the vibration of the load in the freight container.

13. The method of claim 10, wherein the load sensing platform of a mail receptacle is used to determine the at least one of the weight of the load, the position of the load, the temperature of the load, the humidity of the load, and the vibration of the load in the mail receptacle.

14. The method of claim 13, further comprising determining a state of the mail receptacle based on at least one of the weight of the load, the position of the load, the temperature of the load, the humidity of the load and the vibration of the load, wherein the state of the mail receptacle is at least one of an empty state, a partially-filled state, and a full state.

15. The method of claim 14, further comprising generating an alert signal when the mail receptacle is in the full state or when the mail receptacle is unattended for more than a preset period.

16. The method of claim 15, further comprising rendering an optimum route to pick up mails based on the state of the mail receptacle.

17. The method of claim 10, wherein the load sensing platform of a patient bed is used to determine the at least one of the weight of the load, the position of the load, the temperature of the load, the humidity of the load, and the vibration of the load on the patient bed.

18. The method of claim 17, further comprising analyzing a condition of a patient using a number of medical devices coupled to the patient bed, wherein the number of medical devices include at least a temperature gauge to measure a temperature of the patient on the patient bed.

19. The method of claim 10 in a form of a machine-readable medium embodying a set of instructions that, when executed by a machine, cause the machine to perform the method of claim 10.

20. A system, comprising:
a load sensing platform to generate data based on deflections of a plurality of capacitive force-measuring devices arranged in an array due to a load applied on top of the load sensing platform, the load sensing platform including a plurality of reference capacitive devices to compensate error in the data of the plurality of capacitive force-measuring devices;
a control module communicatively coupled to the load sensing platform to process the data of the plurality of capacitive force-measuring devices and error-compensation data of the plurality of reference capacitive devices to determine at least one of a weight of the load, a position of the load, a temperature of the load, a humidity of the load, and the vibration of the load, and wherein processing of the data comprises at least one of aggregating, recording, storing, tracking, reading, calculating, analyzing, communicating, monitoring values generated by the sensor surface and the reference sensor surface, calculating the duration of the load, a particular orientation of the load for a particular duration of time on the base surface of the load sensing platform, calculating changes in a specific gravity associated with the load and generating a timestamp on of the data to track the weight of the load and/or the position of the load; and
a transmitter module of the control module to communicate the data of the plurality of capacitive force-measuring devices and error-compensation data of the plurality of reference capacitive devices to a receiver module remotely located from the load sensing platform.

* * * * *